US012665318B2

(12) United States Patent
Aoki et al.

(10) Patent No.: US 12,665,318 B2
(45) Date of Patent: Jun. 23, 2026

(54) WIRELESS COMMUNICATION APPARATUS, ELECTRONIC EQUIPMENT, AND RADIOGRAPHING SYSTEM

(71) Applicant: CANON KABUSHIKI KAISHA, Tokyo (JP)

(72) Inventors: Makoto Aoki, Tokyo (JP); Tomohisa Ishigami, Tokyo (JP); Yutaka Ishinari, Kanagawa (JP); Yohei Saito, Kanagawa (JP); Eiji Sunaoshi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 18/418,383

(22) Filed: Jan. 22, 2024

(65) Prior Publication Data

US 2024/0258716 A1 Aug. 1, 2024

(30) Foreign Application Priority Data

Jan. 27, 2023 (JP) ................................ 2023-011252
Dec. 8, 2023 (JP) ................................ 2023-207886

(51) Int. Cl.
*H01Q 21/28* (2006.01)
*H01Q 1/42* (2006.01)

(52) U.S. Cl.
CPC ............ *H01Q 21/28* (2013.01); *H01Q 1/422* (2013.01)

(58) Field of Classification Search
CPC ............................... H01Q 21/28; H01Q 1/422
See application file for complete search history.

(56) References Cited

U.S. PATENT DOCUMENTS 10,069,190 B2 9/2018 Aoki
10,250,286 B2 4/2019 Aoki
10,516,200 B2 12/2019 Aoki
10,886,648 B2 1/2021 Aoki
10,978,802 B2 4/2021 Abe
11,412,616 B2 8/2022 Tsuboi
11,839,019 B2 12/2023 Ishigami
2012/0075152 A1 3/2012 Usui
2017/0048649 A1* 2/2017 Olgun ...................... H04B 5/43
2022/0263236 A1 8/2022 Aoki
2022/0353995 A1 11/2022 Tsuboi
2022/0400547 A1 12/2022 Aoki
2023/0403796 A1 12/2023 Tsuboi

FOREIGN PATENT DOCUMENTS

JP 2021-85775 A 6/2021
WO 2010/073429 W 7/2010

* cited by examiner

*Primary Examiner* — Graham P Smith
(74) *Attorney, Agent, or Firm* — VENABLE LLP

(57) ABSTRACT

A wireless communication apparatus includes a first antenna, a second antenna, a control unit configured to output a signal to the first antenna and the second antenna, a first wiring configured to connect the control unit and the first antenna, a second wiring configured to connect the control unit and the second antenna, a casing formed of a conductor, the casing being configured to accommodate the first antenna, the second antenna, the control unit, the first wiring, and the second wiring, and including a first opening disposed in opposition to the first antenna and a second opening disposed in opposition to the second antenna, and a partition portion formed of a conductor and configured to partition the first antenna and the first opening from the second antenna and the second opening.

24 Claims, 28 Drawing Sheets

WIRELESS COMMUNICATION APPARATUS, ELECTRONIC EQUIPMENT, AND RADIOGRAPHING SYSTEM

BACKGROUND OF THE INVENTION

Field of the Invention

The present invention relates to a wireless communication apparatus, an electronic equipment, and a radiographing system.

Description of the Related Art

Some wireless communication apparatuses that perform wireless communication using wireless LAN and Bluetooth (Registered Trademark) adopt a communication system utilizing a plurality of antennas, such as a Multiple Input Multiple Output (MIMO) system. In such a communication system that performs communication simultaneously through a plurality of antennas, communication speed is increased compared to a system where only one antenna is used, but there is a drawback in that communication performance is deteriorated if the radio waves output from the respective antennas interfere with each other. Therefore, WO2010/073429 A1 proposes an antenna unit in which each of a plurality of power fed antenna elements are each provided with two parasitic antennas having a switch. The antenna unit disclosed in WO2010/073429 A1 allows the parasitic antenna to operate as a reflector by switching electrical lengths of the parasitic antenna elements using a switching circuit, in addition to a metal block serving as a reflector, so as to enable switching of directivity of radio waves to thereby reduce radio frequency interference.

There are demands to apply a communication system using a plurality of antennas as described above to an apparatus such as a portable, compact, thin-plate shaped, i.e., tablet-shaped, X-ray imaging apparatus that is capable of visualizing an inside of a living body by X-ray irradiation. However, when a technique as disclosed in WO2010/073429 A1 is applied to such a thin plate-shaped apparatus, since the apparatus has a small thickness, the electrical length may not be maintained unless the parasitic antennas and the metal blocks are bent. When the parasitic antennas and the metal blocks are bent, reflection of radio waves may be deviated, such that partial interference of radio waves becomes inevitable, and the communication performance may be deteriorated.

SUMMARY OF THE INVENTION

According to a first aspect of the present invention, a wireless communication apparatus includes a first antenna, a second antenna, a control unit configured to output a signal to the first antenna and the second antenna, a first wiring configured to connect the control unit and the first antenna, a second wiring configured to connect the control unit and the second antenna, a casing formed of a conductor, the casing being configured to accommodate the first antenna, the second antenna, the control unit, the first wiring, and the second wiring, and including a first opening disposed in opposition to the first antenna and a second opening disposed in opposition to the second antenna, and a partition portion formed of a conductor and configured to partition the first antenna and the first opening from the second antenna and the second opening.

According to a first aspect of the present invention, a wireless communication apparatus includes a first antenna, a second antenna, a control unit configured to output a signal to the first antenna and the second antenna, a first wiring configured to connect the control unit and the first antenna, a second wiring configured to connect the control unit and the second antenna, a casing including a pair of a first plate-shaped surface and a second plate-shaped surface that are each formed of a conductor and that are disposed in opposition to each other, a first side surface, a second side surface, a third side surface, and a fourth side surface configured to connect edges of the first plate-shaped surface and the second plate-shaped surface, the casing configured to accommodate the first antenna, the second antenna, the control unit, the first wiring, and the second wiring, and the casing including a first opening disposed in opposition to the first antenna, a second opening disposed in opposition to the second antenna, and a fifth opening provided between the first opening and the second opening, a first partition portion formed of a conductor and disposed so as to partition the first antenna and the first opening from the fifth opening, a second partition portion formed of a conductor and disposed so as to partition the second antenna and the second opening from the fifth opening, and a third surrounding portion formed of a conductor and disposed so as to surround the fifth opening in a surface direction of the first plate-shaped surface.

Further features of the present invention will become apparent from the following description of exemplary embodiments with reference to the attached drawings.

DESCRIPTION OF THE EMBODIMENTS

First Embodiment

A first embodiment for carrying out the present technique will be described with reference to the drawings.

Configuration of Radiographing System

Figure 19:
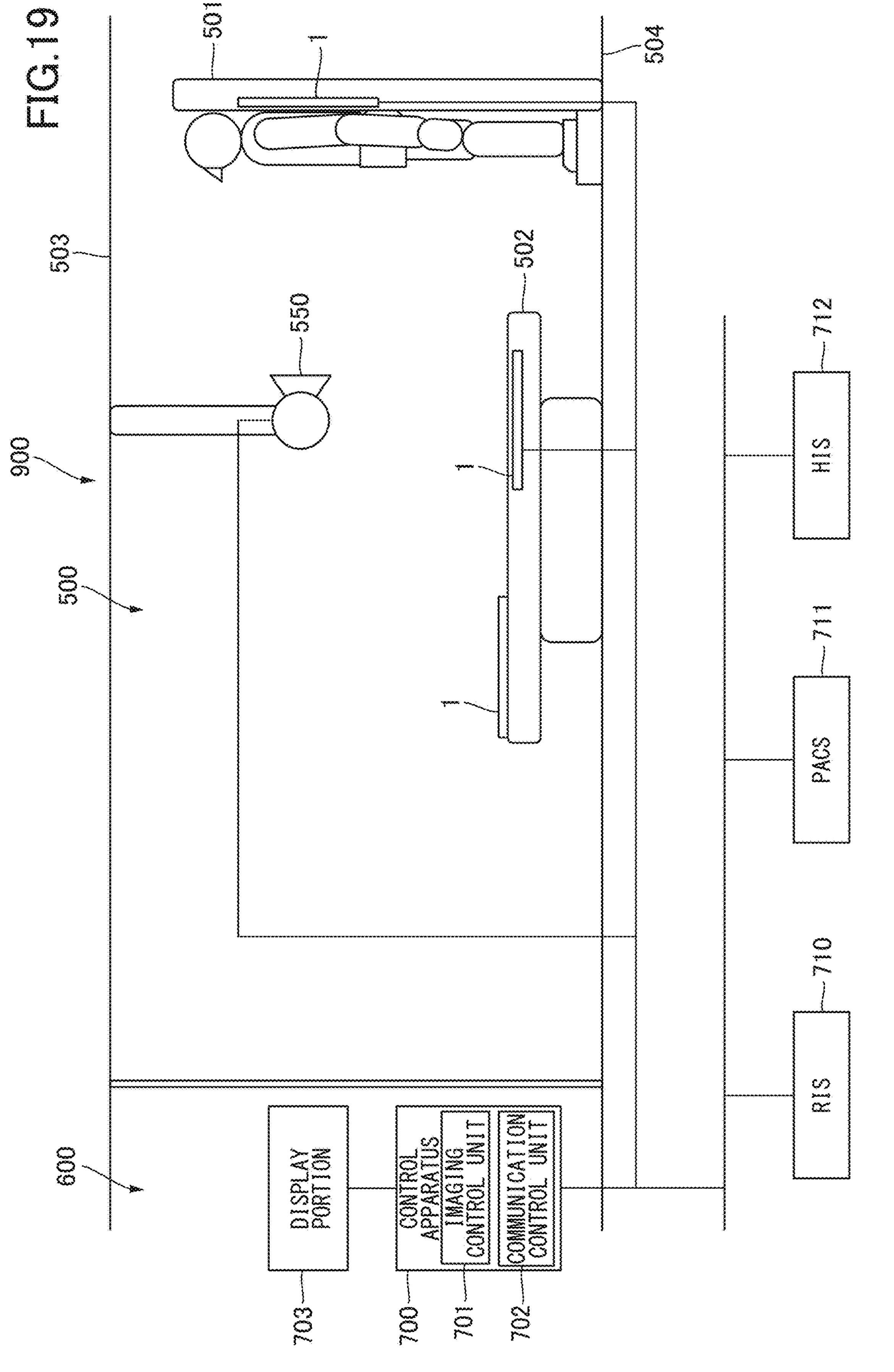
FIG. 19 is a view illustrating one example of a configuration of a radiographing system.

At first, a radiographing system to which the present embodiment may be applied is described. FIG. 19 is a view illustrating one example of a configuration of a radiographing system 900. The radiographing system 900 includes a plurality of wireless communication apparatuses 1, each of which is an electronic equipment or a radiographing apparatus that performs wireless communication, a radiation generating apparatus 550 that generates radiation, and the control apparatus 700 that controls the wireless communication apparatuses 1 and the radiation generating apparatus 550 and performs imaging control. Radiation includes, other than X-rays, α-rays, β-rays, γ-rays, and various corpuscular rays.

The radiation generating apparatus 550 is installed movably on a ceiling 503. The radiographing system 900 is a ceiling traveling system, and the radiation generating apparatus 550 may be moved three-dimensionally in up-down and right-left directions with respect to the ceiling 503.

A stand 501 is fixed to and installed on a floor surface 504. The stand 501 is a support base for upright radiographing. A bed 502 is fixed to and installed on the floor surface 504. The bed 502 is a support base for lying position radiographing. The stand 501 and the bed 502 are each provided with the wireless communication apparatus 1, which are mounted in a detachable manner. The wireless communication apparatus 1 may be replaced and installed. In other words, the wireless communication apparatus 1 accommodated in a storage portion of the bed 502 may be reinstalled in the stand 501.

The radiographing system 900 includes an input device not shown such as a mouse or a keyboard connected to the control apparatus 700 through which an operator may enter instructions, and a display portion 703 that displays a radiation image being taken and various information. The display portion 703 may also serve as the input device such as a touch panel. Further, a terminal apparatus, such as a tablet or a smartphone, that enables instructions from an operator to be entered to the control apparatus 700 and to display the radiation image being taken and various information may be used as the input device and display portion 703. The control apparatus 700 and the display portion 703 are installed in an exterior of a radiographing chamber 600, i.e., operation chamber.

The control apparatus 700 may communicate with a plurality of wireless communication apparatuses 1 and control the radiographing thereof. Further, the control apparatus 700 communicates with the radiation generating apparatus 550 and controls the irradiation of radiation of the radiation generating apparatus 550. In the present embodiment, an example is illustrated where there are three wireless communication apparatuses 1, but the number of wireless communication apparatuses 1 is not limited to three, and it may be one, two, or four or more.

The wireless communication apparatus 1 is transited to an imaging enabled state, i.e., READY state, based on the control performed by the control apparatus 700, and is enabled to perform radiographing by synchronizing with the control apparatus 700. The wireless communication apparatus 1 may perform radiographing of radiation irradiated from the radiation generating apparatus 550 to generate a radiation image data.

The control apparatus 700 may acquire the radiation image data generated by each of the wireless communication apparatuses 1 and transmitted through wireless communication. The radiation image data generated in each wireless communication apparatus 1 is formed into a radiation image at the control apparatus 700 and displayed on the display portion 703 or displayed on a display unit of a terminal device.

The control apparatus 700 has a function to perform various image processing, such as a noise removal processing or a gradation processing, to the radiation image being formed. Further, the control apparatus 700 includes, as a functional configuration, an imaging control unit 701 that sets imaging conditions of the radiation generating apparatus 550, and controls irradiation of radiation from the radiation generating apparatus 550 based on the imaging conditions being set. Further, the control apparatus 700 includes, as functional configuration, a communication control unit 702 that controls wired or wireless communication with the wireless communication apparatus 1 and controls setting of communication conditions of the wireless communication apparatus 1.

As illustrated in FIG. 19, in the case of a ceiling traveling system of the radiation generating apparatus 550, the position of the radiation generating apparatus 550 within an imaging chamber 500 and a direction of irradiation of the radiation generating apparatus 550 are controlled. As illustrated in FIG. 19, if the irradiation direction of the radiation generating apparatus 550 is the horizontal direction, radiation is irradiated toward the stand 501, such that it is assumed that an imaging posture for irradiating radiation is an upright position.

The control apparatus 700 is connected to a Radiology Information System (RIS) 710 that communicates an examination order through a network to the control apparatus 700, a Picture Archiving and Communication Systems (PACS) 711 that manages radiation image, and a Hospital Information System (HIS) 712 that manages the progress of examination.

For example, in a radiation department of a hospital, when an examination order is received by the RIS 710, imaging information related to radiographing, such as imaging conditions and imaging technique, is communicated to the control apparatus 700. The control apparatus 700 executes radiographing according to the received examination order. Then, the control apparatus 700 assigns supplementary information including an examination order to the radiation image being taken, and outputs the same.

The PACS 711 is a server whose main purpose is to manage images. The PACS 711 includes a storage device that stores radiation image and supplementary information. Image inspection operations, detailed postprocessing, and diagnosis operations of the radiation image are executed using a high definition monitor connected to the PACS 711. As described, the radiation image output from the control apparatus 700 is communicated to the PACS 711.

The HIS 712 is a hospital management system, and includes a server for managing an accounting information. When carrying out radiographing, the operator enters an examination instruction from a terminal of the HIS 712. Then, the HIS 712 contacts the radiation department of the hospital, which is a request destination. The request information is called an examination order. The examination order includes a name of a department which is the request client, examination items, and personal data of a subject. Execution information of examination in the radiographing system 900 is notified to the HIS 712. The execution information notified to the HIS 712 is used for an accounting process after examination, in addition to managing the progress of examination.

The control apparatus 700, the RIS 710, the PACS 711, and the HIS 712 are connected through a network composed, for example, of a Local Area Network (LAN) or a Wide Area Network (WAN).

Figure 20A:
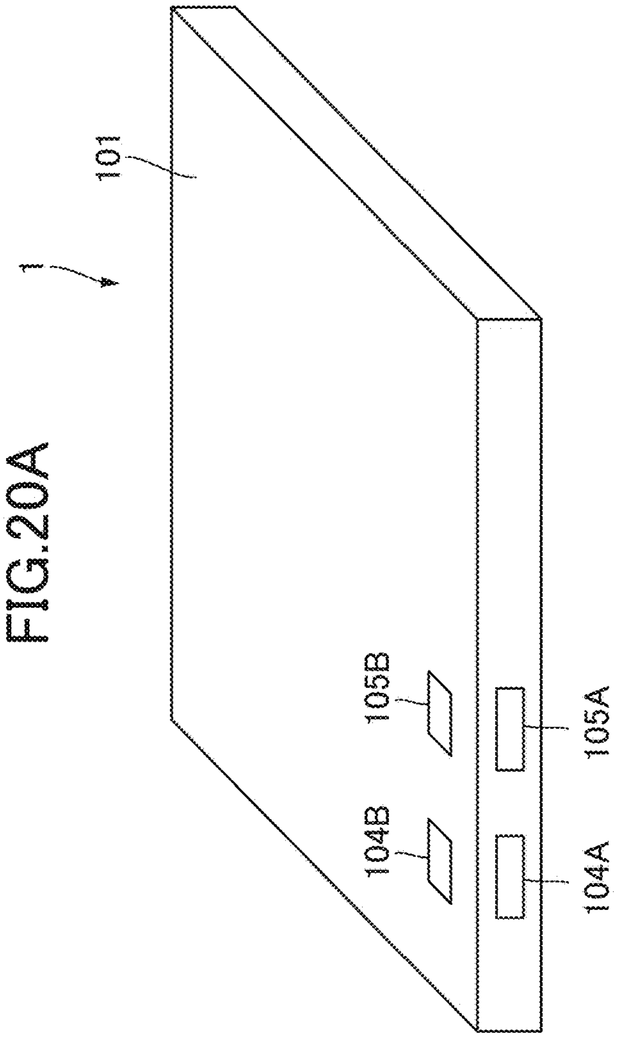
FIG. 20A is a perspective view of the wireless communication apparatus.
Figure 20B:
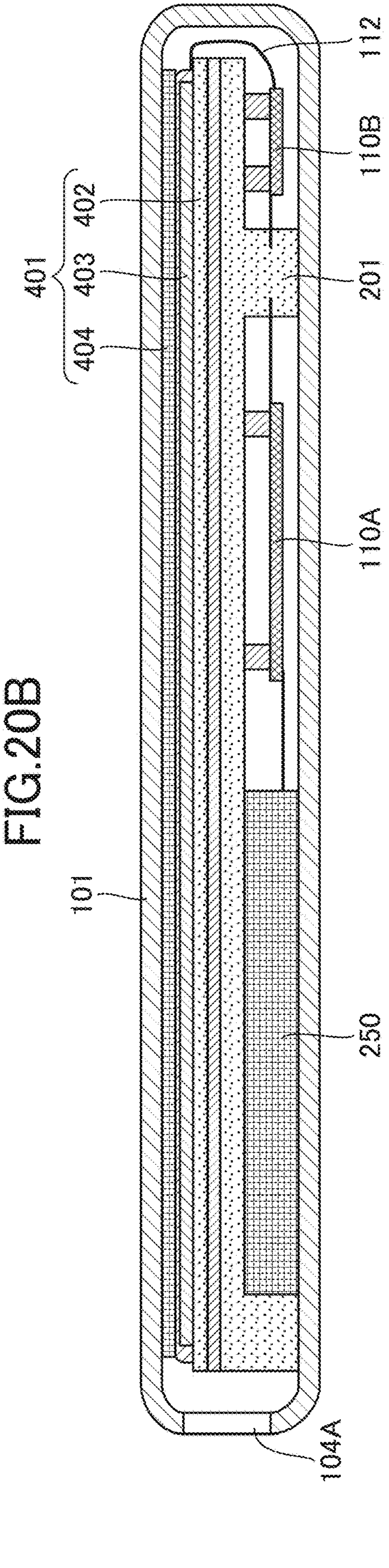
FIG. 20B is a cross-sectional view of the apparatus of FIG. 20A.

Next, an outline of configuration of the wireless communication apparatus 1 will be described. FIG. 20A is a perspective view of the wireless communication apparatus 1, and FIG. 20B is a cross-sectional view of the wireless communication apparatus 1. An X-ray sensor 401, which is a radiation detecting panel serving as an electrooptical device, and a support plate 201 serving as a base for supporting the X-ray sensor 401 are arranged within a casing 101 of the wireless communication apparatus 1. In other words, the wireless communication apparatus 1 constitutes an electronic equipment by being provided with a wireless IC 111 (refer to FIG. 1) for performing wireless communication described in detail later, a first antenna 102, and a second antenna 103. The X-ray sensor 401 is a so-called indirect conversion-type radiation detecting panel which is composed of a sensor substrate 402 provided on a photoelectric conversion element, i.e., sensor, arranged two-dimensionally, a scintillator 403 arranged on the sensor substrate 402, and a scintillator protective film 404, for example.

The scintillator 403 converts irradiated radiation into light corresponding to the intensity thereof, and the photoelectric conversion element is an element that convers the light from the scintillator 403 into electric signals. The scintillator protective film 404 is composed of a material having low moisture permeability, and protects the scintillator 403. Electric signals read from the X-ray sensor 401 through a flexible circuit substrate 115 is processed by a control unit (not shown) mounted on a printed circuit board 110A or a printed circuit board 110B serving as control boards. Hereafter, the printed circuit board 110A and the printed circuit board 110B are collectively referred to as a printed circuit board 110.

In the printed circuit board 110, the electric signals being read is converted by an A/D conversion circuit into digital data, i.e., radiation image data, that indicates attenuation of radiation by a subject. The radiation image data and various settings are stored in a storage unit composed of a volatile memory or a nonvolatile memory. Further, the wireless communication apparatus 1 is equipped with a rechargeable battery 250 for supplying necessary power. The X-ray sensor 401 may be a direct conversion type sensor composed of a conversion element unit in which conversion elements such as a-Se and electric elements such as TFT are arranged two-dimensionally, but it is not limited thereto. Details of components formed on the casing 101 of the wireless communication apparatus 1, such as a first opening 104A, a second opening 105A, a third opening 104B, and a fourth opening 105B, are described below. Further, a connector not shown for feeding power from an exterior through wired connection or for communicating with the exterior may be provided on a part of the casing 101.

Configuration of Wireless Communication Apparatus

Next, details of the wireless communication apparatus 1 will be described with reference to the drawings. In the following description, a suffix is added to the reference sign “1” of the wireless communication apparatus 1, including the modified example of the wireless communication apparatus 1, to thereby distinguish the examples, wherein similar components are denoted with the same reference numbers in the description.

Figure 1A:
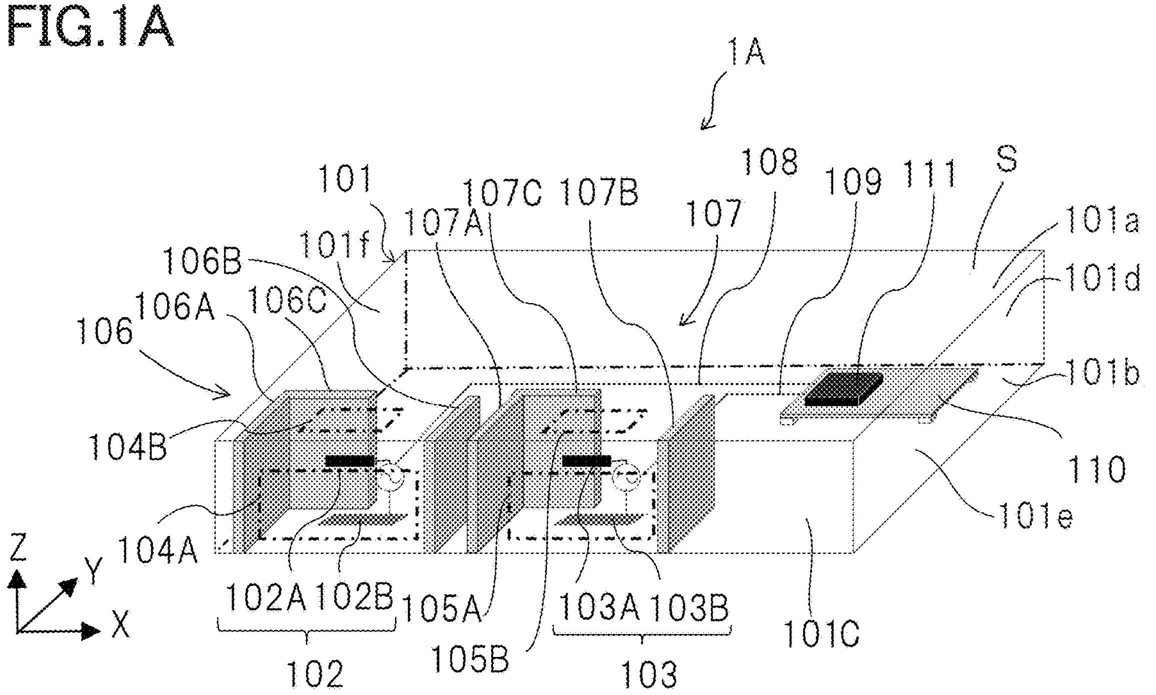
FIG. 1A is a perspective view illustrating in perspective an interior of a wireless communication apparatus according to a first embodiment.
Figure 1B:
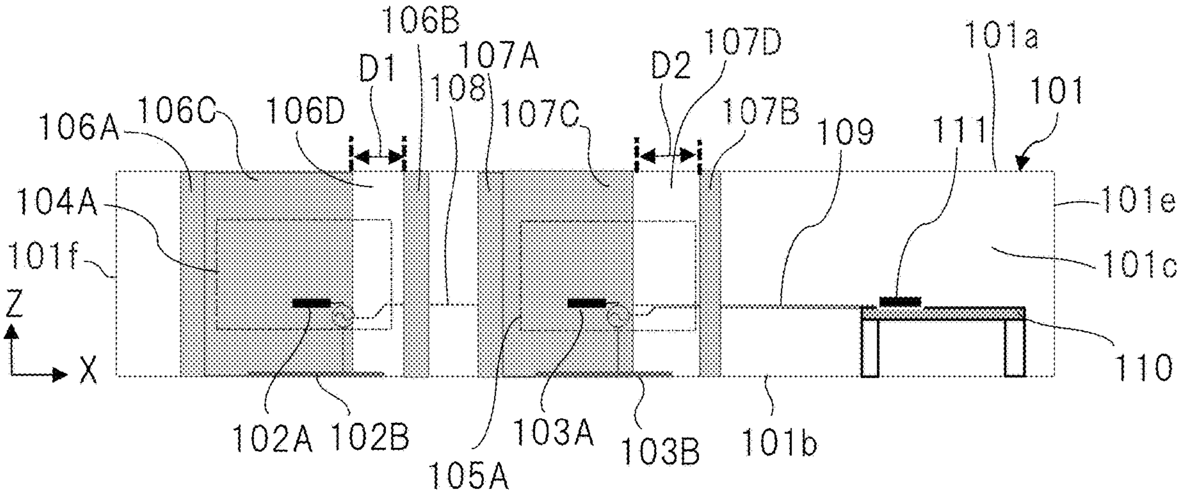
FIG. 1B is a side view of the apparatus of FIG. 1A.

FIG. 1A is a perspective view illustrating in perspective an interior of a wireless communication apparatus according to a first embodiment. FIG. 1B is a side view illustrating in perspective an interior of the wireless communication apparatus according to the first embodiment. For sake of description, a size of the wireless communication apparatus 1 illustrated in FIG. 1 in the Z direction is expanded compared to X and Y directions, so that the layout relationship of the respective components may be easily recognized. One example of the size of the wireless communication apparatus 1 is approximately 500 mm in X and Y directions and 10 mm in the Z direction. Further, the wireless communication apparatuses illustrated in other drawings have similar sizes.

A wireless communication apparatus 1A illustrated in FIGS. 1A and 1B is, for example, a portable, compact X-ray imaging apparatus, i.e., electronic equipment or radiation imaging apparatus, as mentioned above. The wireless communication apparatus 1A is an apparatus for radiographing X-ray radiation irradiated from an X-ray generation apparatus, i.e., radiation generation apparatus, not shown through an imaging region of human and animals, for example. The X-ray imaging apparatus serving as the wireless communication apparatus 1 may be installed in a room or taken outside, and may be installed on a bed or a stand, or supported by a user when used. Examples of the wireless communication method may include a wireless LAN that performs communication through radio waves with a frequency of 2.4 GHz, 5 GHZ, and 6 GHz, and a Bluetooth (Registered Trademark) that performs communication through radio waves with a frequency of 2.4 GHz. However, the present technique is not limited to such communication systems.

As illustrated in FIG. 1, the wireless communication apparatus 1A mainly includes the casing 101, the printed circuit board 110, the first antenna 102, the second antenna 103, a first surrounding portion 106, a second surrounding portion 107, a first cable 108, and a second cable 109.

Configuration of Casing

The casing 101 has a hollow thin plate shape as a whole, and constitute a hexahedron that forms a thin plate-shaped interior space S by six surfaces, which are a pair of plate-shaped surfaces that are disposed in opposition to and in parallel with each other, and four side surfaces that connect the edges of the two plate-shaped surfaces. That is, one pair of plate-shaped surfaces is composed of an upper surface 101*a* serving as a first plate-shaped surface and a lower surface 101*b* serving as a second plate-shaped surface. Further, four side surfaces that connect the edges of the upper surface 101*a* and the lower surface 101*b* are composed of a front surface 101*c* serving as a first side surface, a rear surface 101*d* serving as a second side surface, a side surface 101*e* serving as a third side surface, and a side surface 101*f* serving as a fourth side surface.

The above-mentioned upper surface 101*a*, the lower surface 101*b*, the front surface 101*c*, the rear surface 101*d*, the side surface 101*e*, and the side surface 101*f* may form the interior space S as a sealed space, for example, by integrally forming the surfaces other than the upper surface 101*a*, mounting components to the interior thereof, and then attaching the upper surface 101*a*. The material for forming the upper surface 101*a*, the lower surface 101*b*, the front surface 101*c*, the rear surface 101*d*, the side surface 101*e*, and the side surface 101*f*, that is, the six surfaces, is formed of a conductor. Magnesium alloy, stainless steel and other steel materials, aluminum alloy, zinc alloy, copper, iron, and other metals, may be used as the conductor. Further, conductive resin, a resin member having a mesh-shaped electroconductive member embedded in an interior of the resin member, and a resin member having a conductivity formed of carbon fiber reinforced plastic may be used as the conductor. However, the wireless communication apparatus 1 is formed as a portable member, and it is required to have sufficient strength against impacts such as dropping. Therefore, the casing 101 should have all six surfaces formed of a material having high intensity, such as metal, and in other words, the casing 101 is formed of a conductive material, since it is difficult to achieve a desirable intensity using nonconductive materials.

In FIG. 1, the X direction is a parallel direction in which the first antenna 102 and the second antenna 103 described in detail later are disposed in parallel in the surface direction of the upper surface 101*a*, and the Y direction is a direction orthogonal to the parallel direction in the surface direction of the upper surface 101*a*. Further, the Z direction is a thickness direction of the wireless communication apparatus 1, which is a direction orthogonal to the upper surface 101*a*. In other words, the parallel direction of the first antenna 102 and the second antenna 103 may be described as being a direction orthogonal to the thickness direction. Further, the wireless communication apparatus 1 is portable, but in a state where the apparatus is placed with the lower surface 101*b* facing down, the X direction may also be referred to as a right-left direction, the Y direction may be referred to as a front-rear direction, and the Z direction may be referred to as an up-down direction.

The first opening 104A is formed on the front surface 101*c* of the casing 101 at a position being opposed in the Y direction to an antenna element 102A of the first antenna 102 described in detail later. Further, the second opening 105A is formed on the front surface 101*c* of the casing 101 at a position being opposed in the Y direction to an antenna element 103A of the second antenna 103 described in detail later. The first opening 104A and the second opening 105A are disposed in parallel in the Y direction, which is the right-left direction orthogonal to the thickness direction of the casing 101, similar to the antenna element 102A and the antenna element 103A. Further, a nonconductive resin member not shown is fit in the first opening 104A and the second opening 105A, which enables to seal the interior space S while allowing radio waves to pass, or irradiate, therethrough.

Similarly, the third opening 104B is formed on the upper surface 101*a* of the casing 101 at a position being opposed in the Z direction to the antenna element 102A described in detail later. Further, the fourth opening 105B is formed on the upper surface 101*a* of the casing 101 at a position being opposed in the Z direction to the antenna element 103A described in detail later. The third opening 104B and the fourth opening 105B are disposed in parallel in the Y direction, which is the right-left direction, similar to the antenna element 102A and the antenna element 103A. Further similarly, a nonconductive resin member not shown is fit to the third opening 104B and the fourth opening 105B, which enables to seal the interior space S while allowing radio waves to pass, or irradiate, therethrough. In FIG. 1, the size of the third opening 104B and the fourth opening 105B is illustrated to be smaller than the size of the first opening 104A and the second opening 105A, but the former size may be the same or a larger size than the latter, if a separation distance described later may be ensured.

Configuration of Interior of Casing

The printed circuit board 110 serving as a control unit, the first cable 108, the second cable 109, the first antenna 102, the second antenna 103, the first surrounding portion 106, and the second surrounding portion 107 are accommodated in the interior space S of the casing 101. Among these components, the printed circuit board 110 has installed thereon a CPU not shown for performing various control operations and the wireless IC 111 that generates and outputs radio waves. One end of the first cable 108 and one end of the second cable 109 are connected via connectors not shown to the wireless IC 111, on the other end of the first cable 108 is connected the first antenna 102, and on the other end of the second cable 109 is connected the second antenna 103. Further, the first cable 108 and the second cable 109 are formed of a so-called coaxial cable with a diameter of approximately 1 to 2 mm. Further, the wireless IC 111 performs Multiple Input Multiple Output (MIMO) communication using the first antenna 102 and the second antenna 103. It is noted that each of the above mentioned cables is an example of wiring and a printed wiring patterned on a printed wiring board may be used as an alternative to a cable, for example. Also, each of the antennas may be a printed antenna patterned on a printed wiring board, and at least two of the antenna, the cable and the control unit maybe formed on a single printed wiring board.

The first antenna 102 and the second antenna 103 are each a monopole antenna, in which is adopted an inverted L-shaped antenna or an inverted F-shaped antenna. Among these antennas, the first antenna 102 includes a first antenna element 102A and a first ground 102B which are branched from and connected to a feeding point, i.e., wave source port, to which the other end of the first cable 108 is connected. The first antenna element 102A is supported by an antenna support member not shown, such as a dielectric 102C of FIG. 3 described later, and disposed at a position parallelly separated from the lower surface 101*b*. Further, the first ground 102B is fixed to and supported on the lower surface 101*b*. Therefore, the first antenna element 102A is disposed in opposition in the Y direction to the first opening 104A, and is disposed in opposition in the Z direction to the third opening 104B. That is, in a view illustrated in the Y direction, at least a part of the first opening 104A and the first antenna element 102A overlaps, and in a view illustrated in the Z direction, at least a part of the third opening 104B and the first antenna element 102A overlaps.

Similarly, the second antenna 103 includes a second antenna element 103A and a second ground 103B which are branched from and connected to a feeding point to which the other end of the second cable 109 is connected. The second antenna element 103A is supported by an antenna support member not shown, such as a dielectric 103C of FIG. 3 described later, and disposed at a position parallelly separated from the lower surface 101*b*. Further, the second ground 103B is fixed to and supported on the lower surface 101*b*. Therefore, the second antenna element 103A is disposed in opposition in the Y direction to the second opening 105A, and is disposed in opposition in the Z direction to the fourth opening 105B. That is, in a view illustrated in the Y direction, at least a part of the second opening 105A and the second antenna element 103A overlaps, and in a view illustrated in the Z direction, at least a part of the fourth opening 105B and the second antenna element 103A overlaps.

Configuration Example with Support Plate

Figure 18:
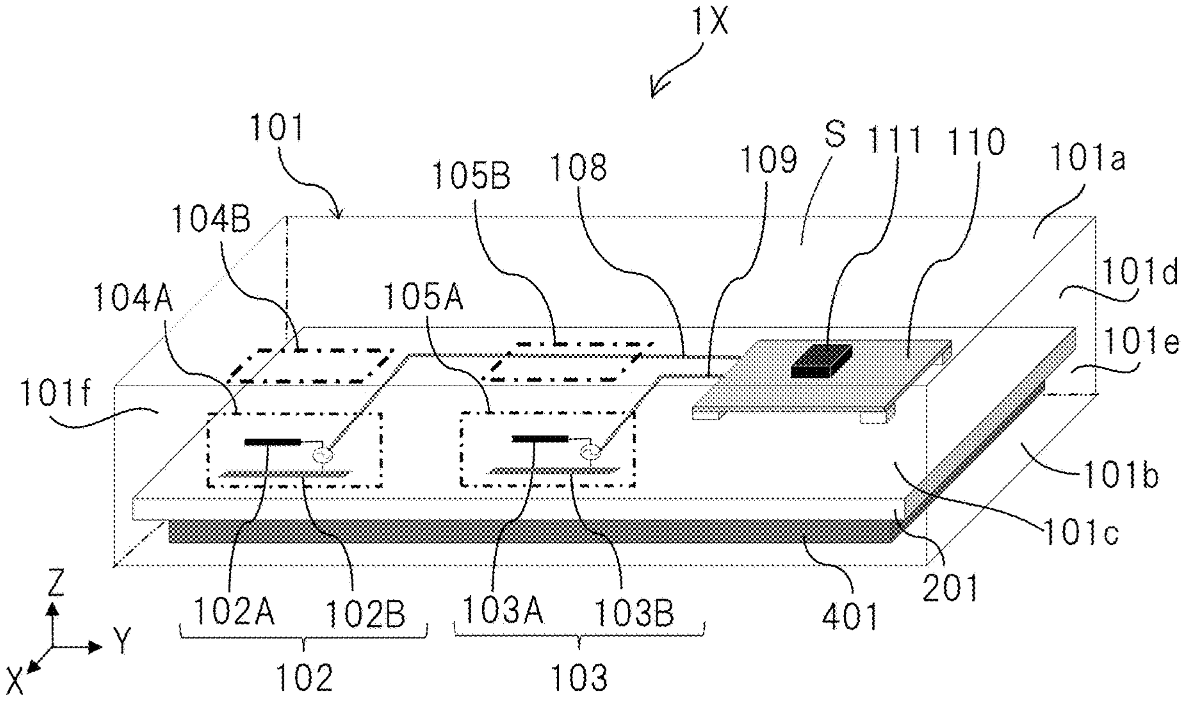
FIG. 18 is a perspective view illustrating in perspective an interior of a wireless communication apparatus equipped with an X-ray sensor.

A wireless communication apparatus 1X equipped with the support plate 201 serving as a support member for supporting the printed circuit board 110 and the X-ray sensor 401 within the casing 101 will be described with reference to FIG. 18. FIG. 18 is a perspective view illustrating in perspective an interior of the wireless communication apparatus equipped with an X-ray sensor. The wireless communication apparatus 1X illustrated in FIG. 18 does not have a partition portion separating the first antenna 102 and the second antenna 103, and in other words, it adopts a configuration of a conventional wireless communication apparatus, wherein the configurations other than the partition portion may also be applied to the wireless communication apparatus 1 illustrated in FIG. 1.

As illustrated in FIG. 18, in the wireless communication apparatus 1X, the support plate 201 is fixed to and supported in the interior of the casing 101, and the printed circuit board 110 is fixed to and supported on the upper surface of the support plate 201. Further, the X-ray sensor 401 is arranged on the lower surface of the support plate 201, and the X-ray sensor 401 enables to realize radiographing of X-rays irradiated from the exterior of the wireless communication apparatus 1X. The X-ray sensor is controlled by a CPU not shown mounted on the printed circuit board 110 and performs radiographing. The image being taken is converted into a radio signal by the control unit and output, or transmitted, through the wireless IC 111 to the first antenna 102 and the second antenna 103. It is noted that a radio signal is a current with a signal/signals superimposed on it and when this signal-superimposed current is supplied to the antennas 102 and 103, radio waves are output from the antennas 102 and 103. In the following explanation, the radio wave itself may also be referred as a radio signal. Furthermore, in the explanation below, wavelength is wavelength of a carrier wave on which the signal is superimposed.

As described, in a case where the support plate 201 is provided on the wireless communication apparatus 1X, the first ground 102B of the first antenna 102 and the second ground 103B of the second antenna 103 mentioned above are fixed to and supported on the support plate 201. Further, the first antenna element 102A of the first antenna 102 and the second antenna element 103A of the second antenna 103 are supported by an antenna support member, such as a dielectric 102C and a dielectric 103C of FIG. 3 described later, to the support plate 201.

Simulation of a Case where Six Surfaces of a Casing are a Conductor

Figure 3A:
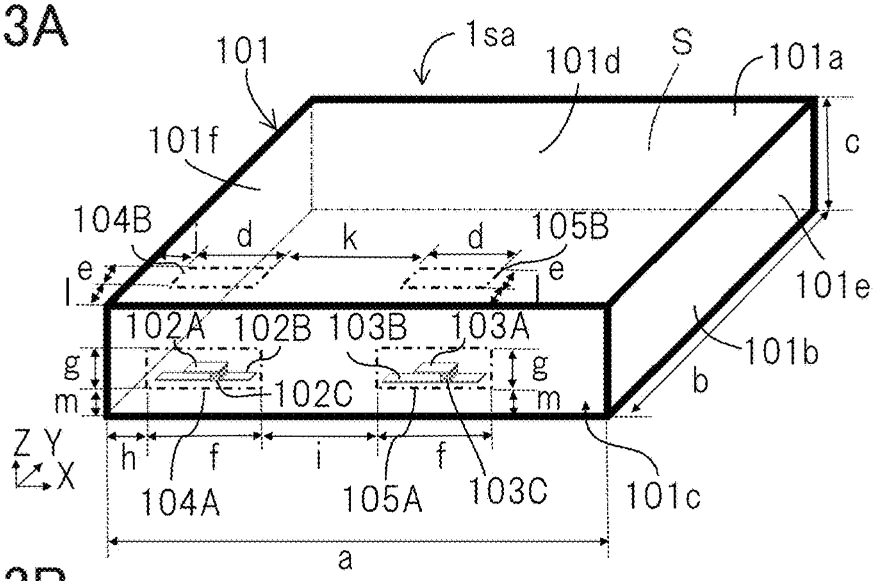
FIG. 3A is a perspective view illustrating a simulation model of the wireless communication apparatus in which a first antenna and a second antenna are disposed in parallel.
Figure 3B:
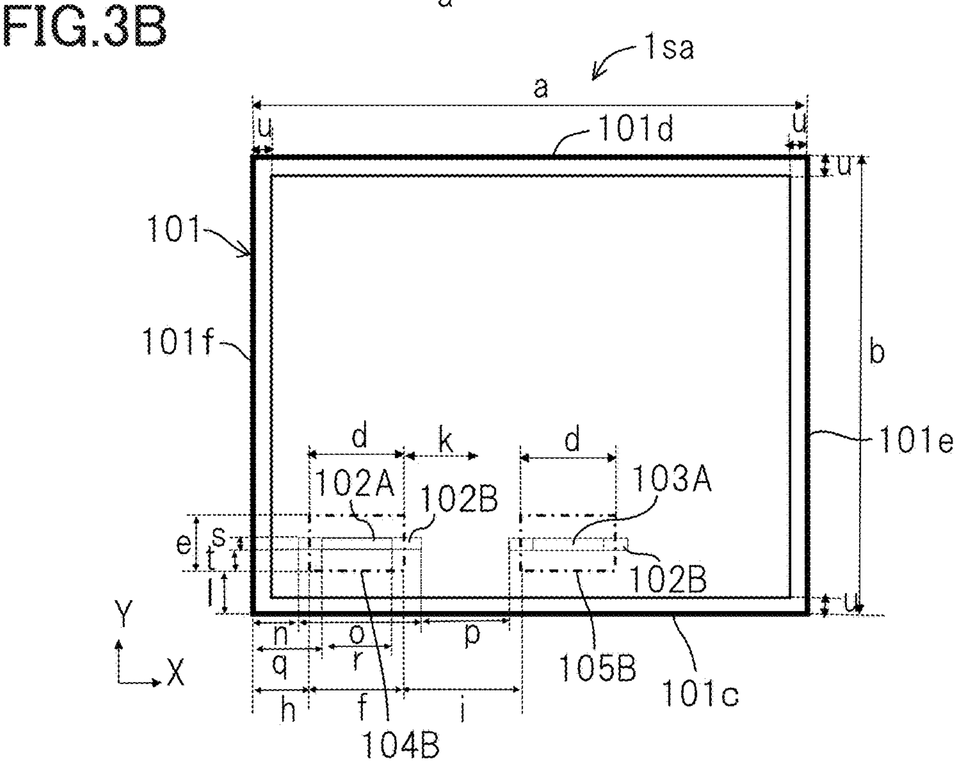
FIG. 3B is an upper view of the simulation model of FIG. 3A.
Figure 3C:
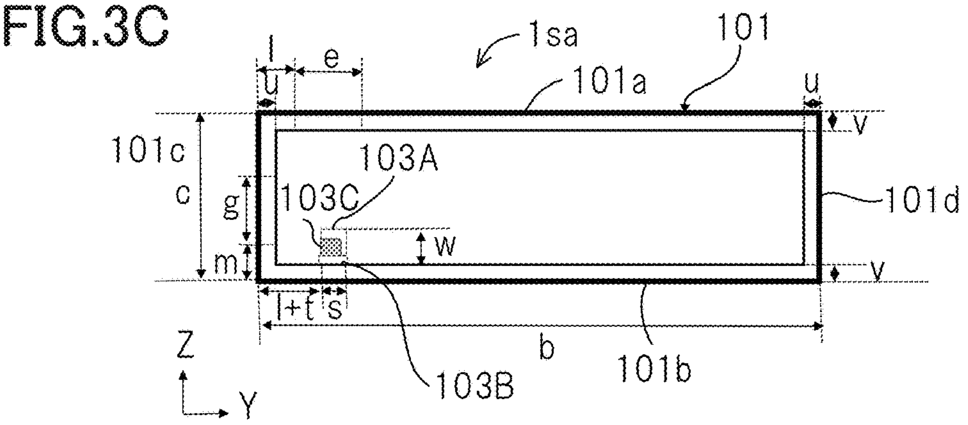
FIG. 3C is a side view of the simulation model of FIG. 3A.
Figure 4:
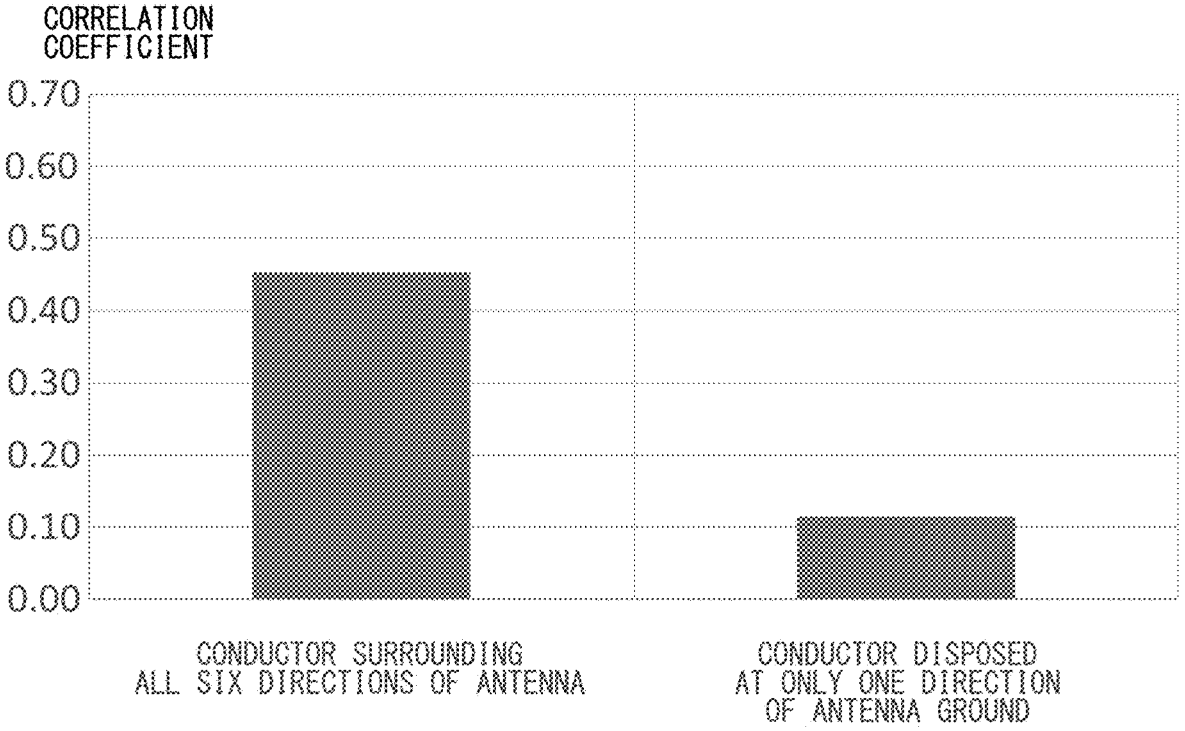
FIG. 4 is a view illustrating a correlation coefficient of a degree of interference of radio waves in a case where six surfaces of a casing of the wireless communication apparatus are formed of a conductor and in a case where one surface of the casing of the wireless communication apparatus is formed of a conductor.

A difference of radio frequency interferences between the first antenna 102 and the second antenna 103 that occurs in a case where all six surfaces of the casing 101 are a conductor and a case where only the lower surface 101*b* is a conductor will be described with reference to the drawings. FIG. 3A is a perspective view illustrating a simulation model of a wireless communication apparatus in a case where the first antenna and the second antenna are disposed in parallel. FIG. 3B is an upper view illustrating the simulation model of a wireless communication apparatus in a case where the first antenna and the second antenna are disposed in parallel. FIG. 3C is a side view illustrating the simulation model of a wireless communication apparatus in a case where the first antenna and the second antenna are disposed in parallel. FIG. 4 is a view illustrating a correlation coefficient of a degree of interference of radio waves in a case where the six surfaces of the casing of the wireless communication apparatus are a conductor and a case where one surface of the casing of the wireless communication apparatus is a conductor.

A wireless communication apparatus 1*sa* illustrated in FIGS. 3A, 3B, and 3C is a simulation model constructed in a virtual space by an electromagnetic field simulator MW-STUDIO (product of CST Corporation). The wireless communication apparatus 1*sa* is not equipped with the first surrounding portion 106 and the second surrounding portion 107 (refer for example to FIG. 1A) described in detail later. The conductivity of the casing 101 is $3.56\times10^{7}$ [S/m], the relative dielectric constant is 1, and the relative magnetic permeability is also 1. The dimensions of respective portions illustrated in FIGS. 3A, 3B, and 3C are as illustrated in Table 1.

TABLE 1

| Dimension of Simulation Model | | | | | | | | |
|---|---|---|---|---|---|---|---|---|
| | a | b | c | d | e | f | g | h |
| DIMENSION [mm] | 460 | 460 | 15.5 | 40 | 20 | 60 | 5 | 34 |
| | i | j | k | l | m | n | o | p |
| DIMENSION [mm] | 10 | 44 | 30 | 14 | 5.25 | 21.9 | 50 | 20.1 |
| | q | r | s | t | u | v | w | |
| DIMENSION [mm] | 52.3 | 26.5 | 6 | 4.75 | 5 | 2 | 3.5 | |

A result having performed a simulation of simultaneously outputting radio waves of 2.4 [GHz] from the first antenna 102 and the second antenna 103 in the wireless communication apparatus 1*sa* of the simulation model configured as above is illustrated in FIG. 4. A correlation coefficient is an index computed by setting 1 as a maximum value of a degree of interference between the radio waves generated from one of the antennas and reaching a distant electromagnetic field and radio waves generated from the other antenna and reaching a distant electromagnetic field. In a case where the value of the correlation coefficient is 0, it indicates that there is no radio frequency interference.

FIG. 4 illustrates the correlation coefficient of a case where only the lower surface 101*b* is formed of a conductor and the other five surfaces are formed of a resin material having a relative dielectric constant of 3.5, and of a case where all six surfaces are formed of a conductor, i.e., all six directions surrounding the antenna are formed of a conductor, in the casing 101 of the wireless communication apparatus 1*sa*. For example, compared to a casing where five surfaces are formed of a resin material, such as a general wireless communication apparatus, in the casing 101 according to the present embodiment where all six surfaces are formed of a conductor, it can be recognized that the correlation coefficient is deteriorated. That is, if all six directions of the antenna are surrounded by a conductor, the reflection of radio waves becomes complex, and the radio frequency interference is increased. Even if a parasitic antenna or a metal block is installed in the interior of such casing 101, such as in the technique disclosed in WO2010/073429 A1, the effects thereof are difficult to achieve, and the communication performance is deteriorated. Therefore, according to the present embodiment, the first surrounding portion 106 and the second surrounding portion 107 described below are installed according to the present embodiment.

Configuration of First Surrounding Portion and Second Surrounding Portion

Next, a configuration of the first surrounding portion 106 and the second surrounding portion 107 in the wireless communication apparatus 1A will be described. As illustrated in FIGS. 1A and 1B, the first surrounding portion 106 serving as a partition portion is provided to surround the first antenna 102, the first opening 104A, and the third opening 104B, in the interior space S of the casing 101.

The first surrounding portion 106 partitions the first antenna 102, the first opening 104A, and the third opening 104B from the second antenna 103 and the printed circuit board 110. In other words, the first surrounding portion 106 realizes separation of radio waves such that the radio waves output from the first antenna 102 are not diffused and reflected in the interior space S including the second antenna 103 excluding the first surrounding portion 106. The first surrounding portion 106 is composed of a first plate portion 106A, a second plate portion 106B, and a third plate portion 106C which are erected to extend from the lower surface 101*b* in a thickness direction orthogonal to the lower surface 101*b*. That is, by having the front surface 101*c*, the first plate portion 106A, the second plate portion 106B, and the third plate portion 106C arranged in a quadrangular shape when viewed in the thickness direction, the first surrounding portion 106 surrounds the first antenna 102 in a surface direction parallel to the upper surface 101*a*.

Specifically, the first plate portion 106A has one end thereof connected to the front surface 101*c*, and is arranged to extend in the Y direction that is a direction intersecting the front surface 101*c*. Further, the second plate portion 106B has one end thereof connected to the front surface 101*c*, and is arranged to extend in the direction intersecting the front surface 101*c* and disposed in parallel with the first plate portion 106A. The third plate portion 106C is disposed parallelly and in opposition to the front surface 101*c*, and it is connected to the first plate portion 106A and arranged to form a first passage portion 106D at a distance D1 from the second plate portion 106B. The third plate portion 106C may also be connected to the second plate portion 106B and arranged to form the first passage portion 106D between the first plate portion 106A. Moreover, the third plate portion 106C may have both ends connected to the first plate portion 106A and the second plate portion 106B, and have the first passage portion 106D formed in a slit-like shape in the middle.

Similarly, the second surrounding portion 107 serving as a partition portion partitions the second antenna 103, the second opening 105A, and the fourth opening 105B from the first antenna 102 and the printed circuit board 110. In other words, the second surrounding portion 107 realizes separation of radio waves such that the radio waves output from the second antenna 103 are not diffused and reflected in the interior space S including the first antenna 102 excluding the second surrounding portion 107. The second surrounding portion 107 is composed of a first plate portion 107A, a second plate portion 107B, and a third plate portion 107C which are erected to extend from the lower surface 101*b* in a thickness direction orthogonal to the lower surface 101*b*. That is, by having the front surface 101*c*, the first plate portion 107A, the second plate portion 107B, and the third plate portion 107C arranged in a quadrangular shape when viewed in the thickness direction, the second surrounding portion 107 surrounds the second antenna 103 in a surface direction parallel to the upper surface 101*a*.

Specifically, the first plate portion 107A has one end thereof connected to the front surface 101*c*, and is disposed to extend in the Y direction that is a direction intersecting the front surface 101*c*. Further, the second plate portion 107B has one end thereof connected to the front surface 101*c*, and is disposed to extend in the direction intersecting the front surface 101*c* and disposed parallelly and in opposition to the first plate portion 107A. The third plate portion 107C is disposed parallelly and in opposition to the front surface 101*c*, and it is connected to the first plate portion 107A and arranged to form a second passage portion 107D at a distance D2 from the second plate portion 107B. The third plate portion 107C may also be connected to the second plate portion 107B and arranged to form the second passage portion 107D between the first plate portion 107A. Moreover, the third plate portion 107C may have both ends connected to the first plate portion 107A and the second plate portion 107B, and have the second passage portion 107D formed in a slit-like shape in the middle.

The above-mentioned first passage portion 106D is formed to allow the first cable 108 to pass through, and the above-mentioned second passage portion 107D is formed to allow the second cable 109 to pass through. For example, when assembling the wireless communication apparatus 1A, the operator manually inserts the first cable 108 from above to the first passage portion 106D, and manually inserts the second cable 109 from above to the second passage portion 107D. Thereafter, the upper surface 101*a* is closed to complete the wireless communication apparatus 1A. For example, when through holes for passing through the first cable 108 and the second cable 109 are formed to the third plate portions 106C and 107C, the operator must perform an operation to pass the cables through the through hole. However, according to the present embodiments, the operator simply places the first cable 108 and the second cable 109 from above into the first passage portion 106D and the second passage portion 107D.

As described, it is necessary to form the first passage portion 106D that allows the first cable 108 to pass through and the second passage portion 107D that allows the second cable 109 to pass through to the first surrounding portion 106 and the second surrounding portion 107. However, if the first surrounding portion 106 and the second surrounding portion 107 allow radio waves to pass through the first passage portion 106D and the second passage portion 107D, the radio waves are reflected within the interior space S of the casing 101 and cause radio frequency interferences. Therefore, the maximum widths of the first passage portion 106D and the second passage portion 107D are set as described below.

Figure 2A:
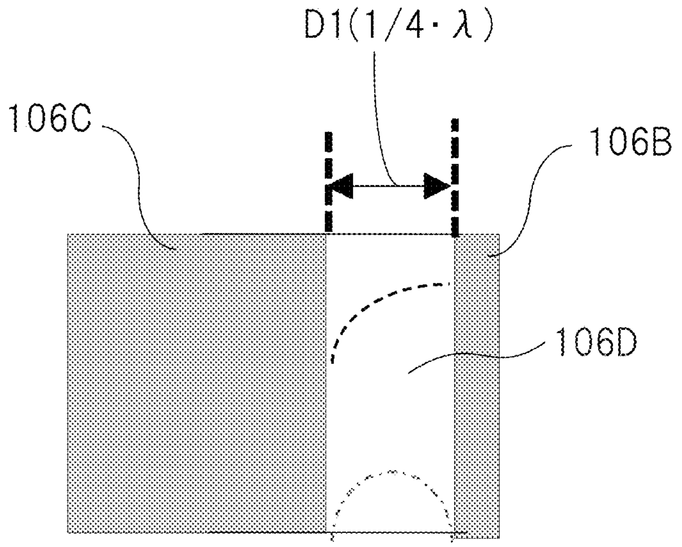
FIG. 2A is a schematic diagram illustrating a first surrounding portion in which a width of a passage portion through which a cable is passed is ¼ a wavelength of a radio signal.
Figure 2B:
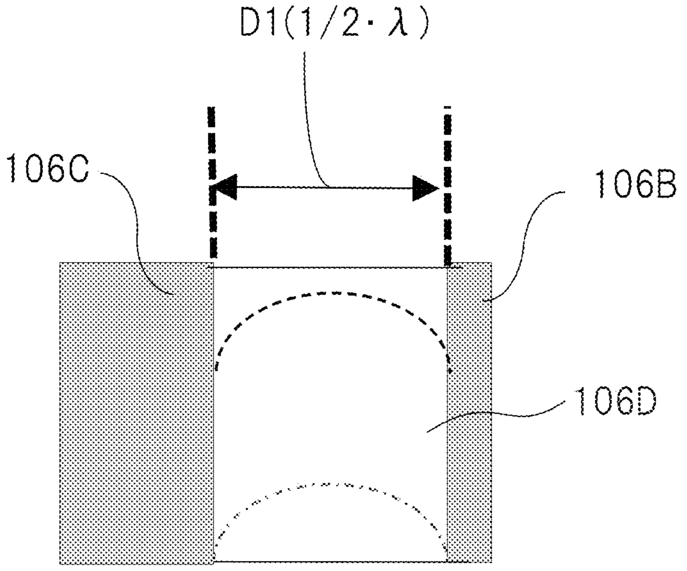
FIG. 2B is a schematic diagram illustrating a first surrounding portion in which a width of a passage portion through which a cable is passed is ½ the wavelength of the radio signal.

An electric field intensity formed when radio waves are transmitted is illustrated with reference to the drawings, taking the first passage portion 106D as an example. FIG. 2A is a schematic diagram illustrating a first surrounding portion in which the passage portion through which the cable is passed has a width of ¼ the wavelength of the radio signal. FIG. 2B is a schematic diagram illustrating a first surrounding portion in which the passage portion through which the cable is passed has a width of ½ the wavelength of the radio signal.

Further, as illustrated in FIG. 2A, if the distance D1 of the width of the first passage portion 106D is ¼ a wavelength $\lambda$ calculated from a frequency f of the wireless radio wave being used and a velocity of light C, the electric field intensity shown by the dotted lines has one end portion being low and the other end portion being high. If the electric field intensity is high, impedance becomes high, but since both end portions have a shielding member composed of a conductor connected to the casing, the impedance becomes low, and since it does not correspond to the electric field intensity being formed, radio waves are not transmitted therethrough. Meanwhile, as illustrated in FIG. 2B, if the distance D1 of the width of the first passage portion 106D is ½ the wavelength $\lambda$ of the wireless radio wave being used, the formed electric field intensity and the impedance at both end portions match, such that the radio waves are transmitted.

That is, by setting the distance D1 of the width of the first passage portion 106D and the distance D2 of the width of the second passage portion 107D to be smaller than λ/2 the wavelength of the frequency being used, the effect of suppressing the radio frequency interference may be achieved, and by setting the distances to λ/4 or smaller, the maximum effect may be achieved. However, as the distance D1 of the width of the first passage portion 106D and the distance D2 of the width of the second passage portion 107D increases, the assembling property of laying the first cable 108 and the second cable 109 becomes easier. Therefore, the distance D1 of the width of the first passage portion 106D and the distance D2 of the width of the second passage portion 107D should preferably be as great as possible within the range smaller than wavelength λ/2.

Figure 5A:
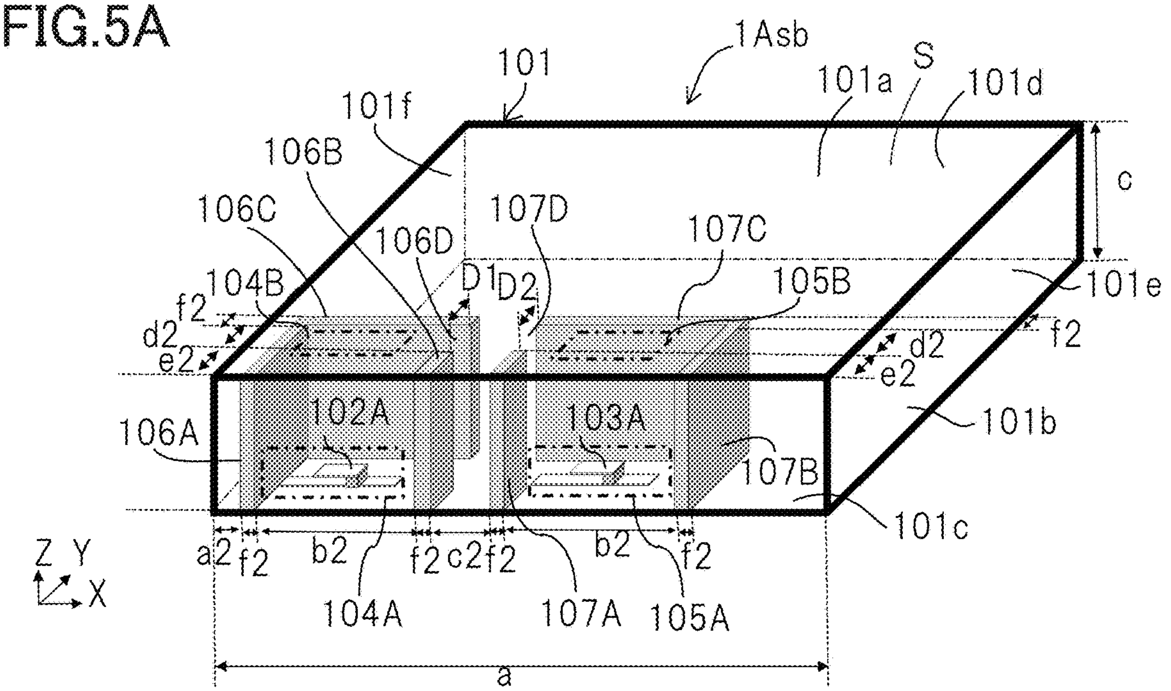
FIG. 5A is a perspective view illustrating a simulation model of a wireless communication apparatus in which a first surrounding portion surrounding a first antenna and a second surrounding portion surrounding a second antenna are disposed, and wherein a first passage portion and a second passage portion are disposed in opposition to each other.
Figure 5B:
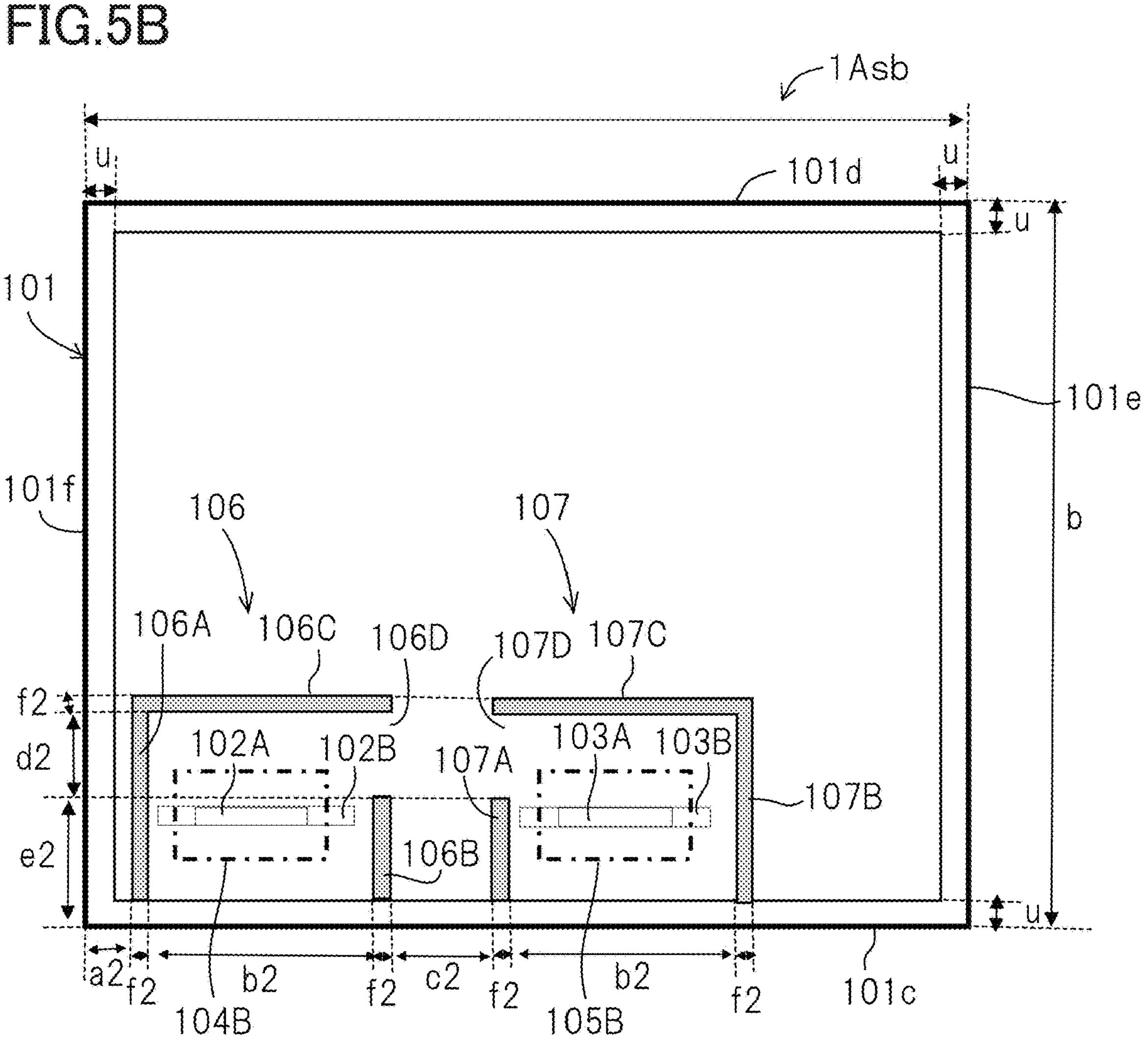
FIG. 5B is an upper view of the simulation model of FIG. 5A
Figure 6:
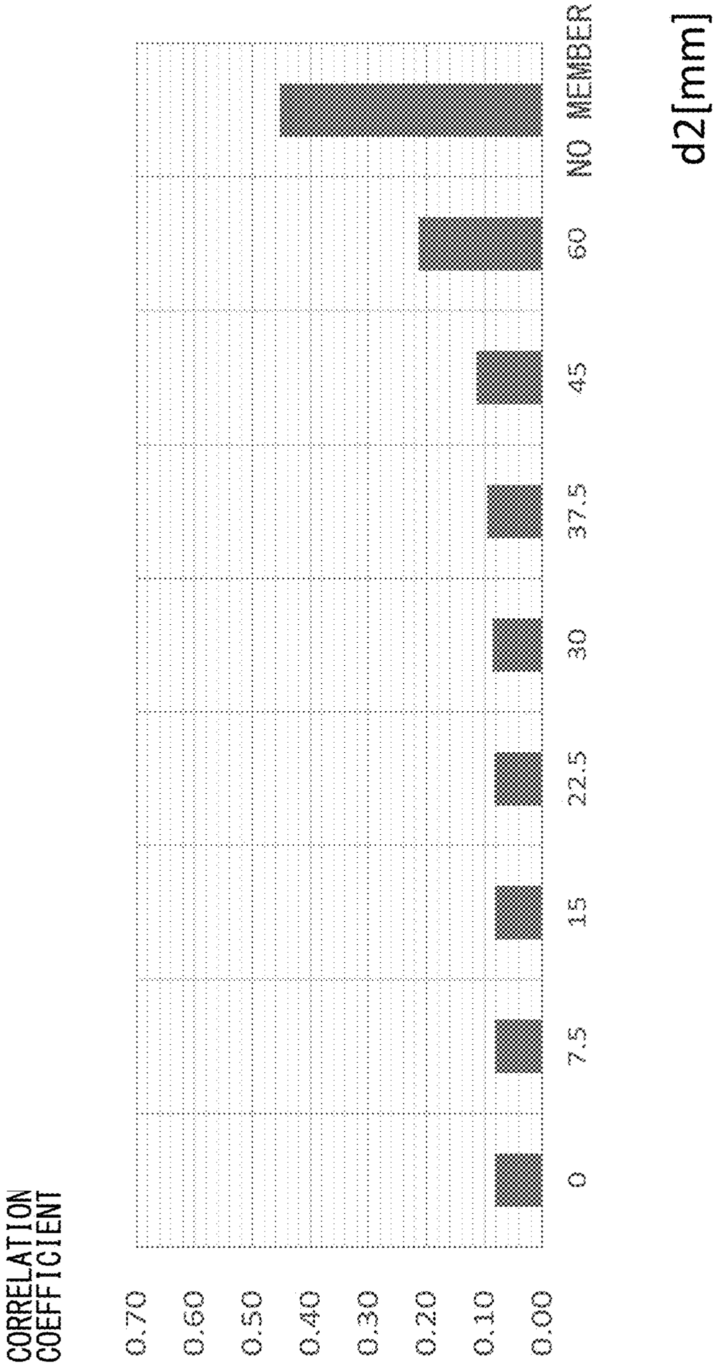
FIG. 6 is a view illustrating a simulation result of a relationship between a width of the first passage portion and the second passage portion and a correlation coefficient of the degree of interference of radio waves in a case where the first passage portion and the second passage portion are disposed in opposition to each other.

Simulation of a Case where the First Passage Portion and the Second Passage Portion are Opposed and the Width of the First Passage Portion and the Second Passage Portion is Varied Next, a simulation of a wireless communication apparatus in which the first passage portion 106D of the first surrounding portion 106 and the second passage portion 107D of the second surrounding portion 107 are disposed in opposition will be described with reference to the drawings. FIG. 5A is a perspective view illustrating a simulation model of a wireless communication apparatus in which a first surrounding portion surrounding a first antenna and a second surrounding portion surrounding a second antenna are disposed, and wherein a first passage portion and a second passage portion are disposed in opposition to each other. FIG. 5B is an upper view illustrating the simulation model of a wireless communication apparatus in which a first surrounding portion surrounding a first antenna and a second surrounding portion surrounding a second antenna are disposed, and wherein a first passage portion and a second passage portion are disposed in opposition to each other. FIG. 6 is a view illustrating a simulation result of a relationship between widths of the first passage portion and the second passage portion and a correlation coefficient of the degree of interference of radio waves in a case where the first passage portion and the second passage portion are disposed in opposition to each other.

A wireless communication apparatus 1Asb illustrated in FIGS. 5A and 5B is a simulation model constructed by the simulator mentioned above. According to the wireless communication apparatus 1Asb, the first passage portion 106D is formed on the second plate portion 106B in the first surrounding portion 106, and the second passage portion 107D is formed on the first plate portion 107A in the second surrounding portion 107. Accordingly, the first passage portion 106D and the second passage portion 107D are disposed in opposition to each other in the X direction. The other configurations are similar to the wireless communication apparatus 1A illustrated in FIGS. 1A and 1B. Further, the dimensions of various portions illustrated in FIGS. 5A and 5B are as shown in the following Table 2. The dimensions of respective portions not shown in FIGS. 5A and 5B are the same as the dimensions of FIGS. 3A, 3B, and 3C (refer to Table 1).

TABLE 2

| Dimensions of Simulation Model | | | | | | | | | | |
|---|---|---|---|---|---|---|---|---|---|---|
| | a | b | c | u | a2 | b2 | c2 | d2 | e2 | f2 |
| DIMENSION [mm] | 460 | 460 | 15.5 | 5 | 30 | 61.25 | 3.12 | 22.5 | 52.55 | 3 |

Using the wireless communication apparatus 1Asb of the simulation model configured as above, a simulation is performed of a case where radio waves with a frequency of 2.4 [GHz] are output simultaneously from the first antenna 102 and the second antenna 103. Then, the results of numeric values of correlation coefficients of a case where a dimension d2 of the first passage portion 106D and the second passage portion 107D is varied from 22.5 [mm] in this simulation are shown in FIG. 6.

The wavelength of radio waves with a frequency of 2.4 [GHz] is approximately 124.9 [mm]. As illustrated in FIG. 6, if the dimension d2 is set to 60 [mm] or 45 [mm], which is smaller than ½ the wavelength λ, it is recognized that the correlation coefficient is reduced to half compared to the case where the first surrounding portion 106 and the second surrounding portion 107 are not provided. Specifically, if the dimension d2 is 30 [mm] or smaller, which is ¼ the wavelength λ or smaller, it can be recognized that the change of numeric value is small and maximum effects are achieved.

Figure 7A:
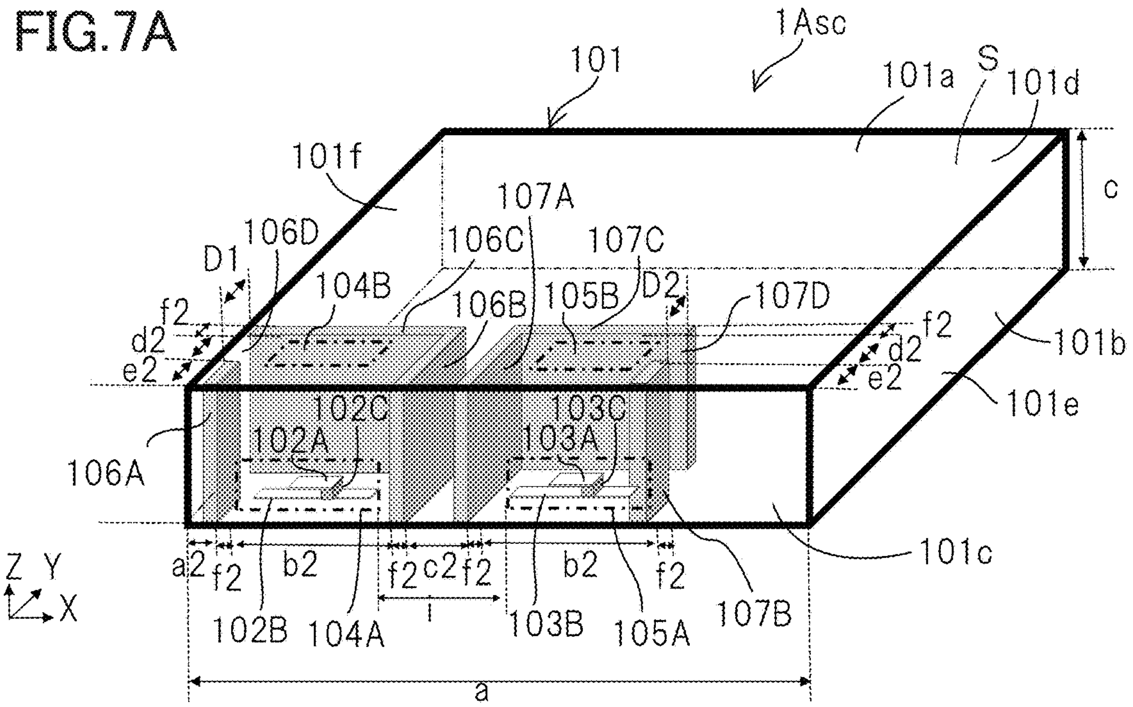
FIG. 7A is a perspective view illustrating a simulation model of the wireless communication apparatus in which a first surrounding portion surrounding a first antenna and a second surrounding portion surrounding a second antenna are disposed, and wherein the first passage portion and the second passage portion are not disposed in opposition to each other.
Figure 7B:
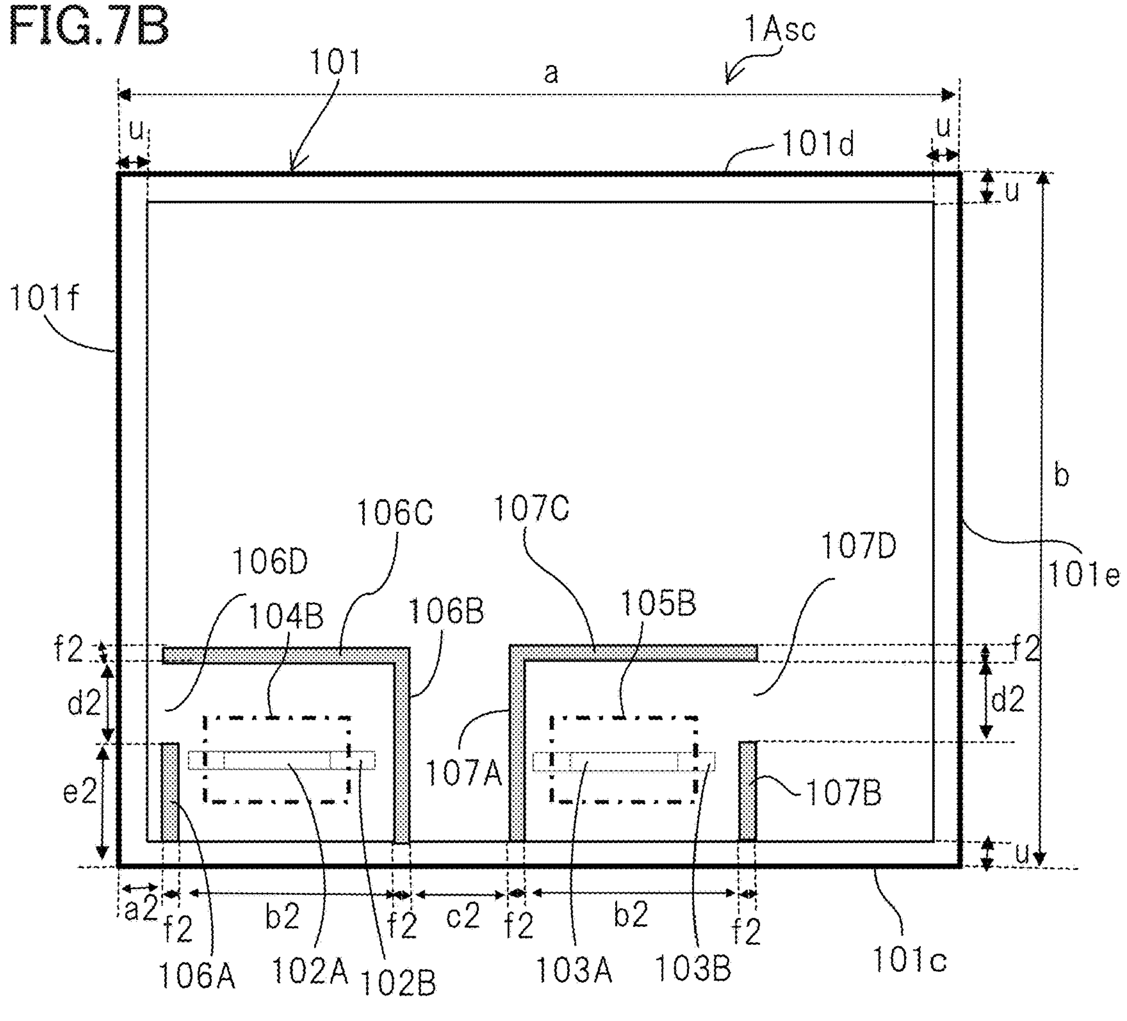
FIG. 7B is an upper view of the simulation model of FIG. 7A.
Figure 8:
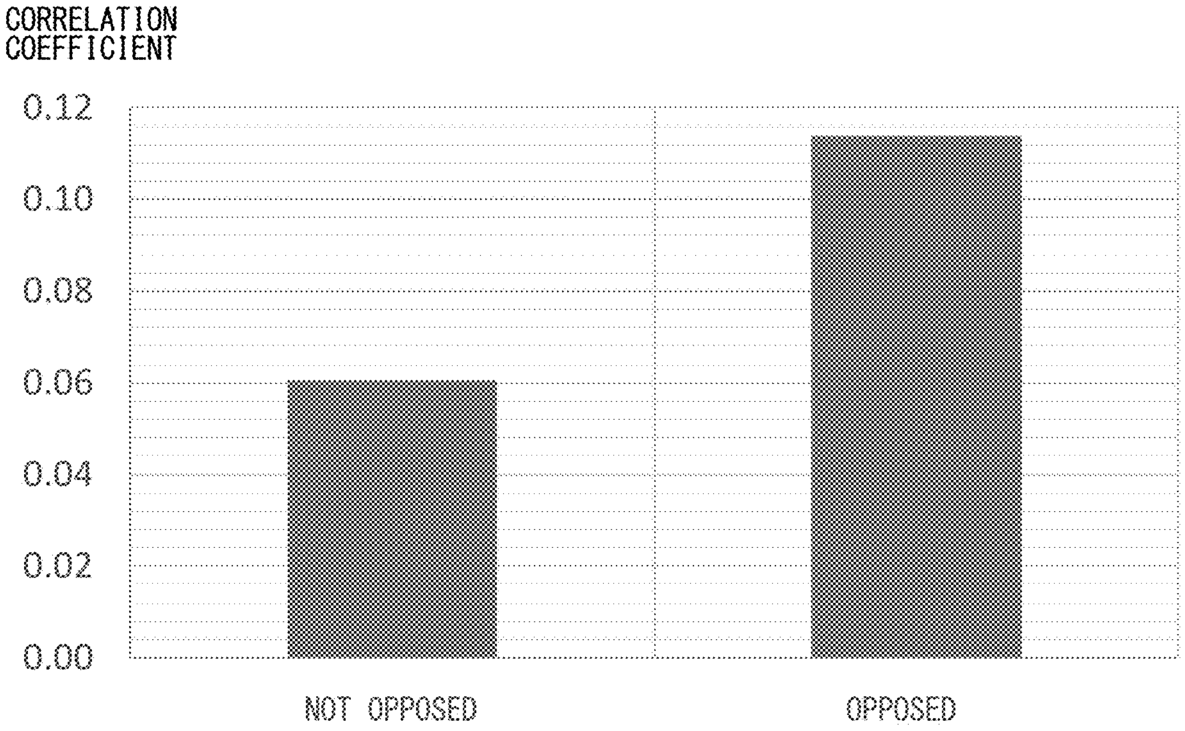
FIG. 8 is a view illustrating a simulation result of a correlation coefficient of a degree of interference of radio waves in a case where the first passage portion and the second passage portion are disposed in opposition to each other, and in a case where the first passage portion and the second passage portion are not disposed in opposition to each other.

Simulation of a Case where the First Passage Portion and the Second Passage Portion are Opposed and a Case where they are not Opposed Next, difference of radio frequency interferences between a case where the first passage portion 106D and the second passage portion 107D are opposed and a case where they are not opposed will be described with reference to the drawings. FIG. 7A is a perspective view illustrating a simulation model of the wireless communication apparatus in which a first surrounding portion surrounding a first antenna and a second surrounding portion surrounding a second antenna are disposed, and wherein the first passage portion and the second passage portion are not disposed in opposition to each other. FIG. 7B is an upper view illustrating a simulation model of the wireless communication apparatus in which a first surrounding portion surrounding a first antenna and a second surrounding portion surrounding a second antenna are disposed, and wherein the first passage portion and the second passage portion are not disposed in opposition to each other. FIG. 8 is a view illustrating a simulation result of a correlation coefficient of a degree of interference of radio waves in a case where the first passage portion and the second passage portion are disposed in opposition to each other, and in a case where the first passage portion and the second passage portion are not disposed in opposition to each other.

A wireless communication apparatus 1Asc illustrated in FIGS. 7A and 7B is a simulation model constructed by the simulator mentioned above. According to the wireless communication apparatus 1Asc, the first passage portion 106D is formed on the first plate portion 106A in the first surrounding portion 106, and the second passage portion 107D is formed on the second plate portion 107B in the second surrounding portion 107. Accordingly, the first passage portion 106D and the second passage portion 107D are disposed on the opposite side from the first antenna 102 and the second antenna 103, that is, they are not disposed in opposition to each other. The other configurations are similar to the wireless communication apparatus 1A illustrated in FIGS. 1A and 1B, and the wireless communication apparatus 1Asb illustrated in FIGS. 5A and 5B.

The correlation coefficient of the degree of interference of radio waves illustrated in FIG. 8 shows the results of simulation performed in the wireless communication apparatus 1Asb illustrated in FIGS. 5A and 5B and the wireless communication apparatus 1Asc illustrated in FIGS. 7A and 7B. That is, FIG. 8 illustrates the result of simulation performed of a case where the first passage portion 106D and the second passage portion 107D are opposed and a case where they are not opposed to each other. In this simulation, the frequency is set to 2.4 [GHz], and the dimension d2 of the first passage portion 106D and the second passage portion 107D is set to 45 [mm], which is greater than ¼ the wavelength λ and smaller than ½ the wavelength λ.

As illustrated in FIG. 8, if the dimension d2 of the first passage portion 106D and the second passage portion 107D is greater than ¼ the wavelength λ, a small amount of radio waves passes through, such that if the first passage portion 106D and the second passage portion 107D are opposed to each other, it is recognized that the correlation coefficient of the degree of interference of radio waves is increased. Meanwhile, by arranging the first passage portion 106D and the second passage portion 107D so as not to oppose each other, the correlation coefficient of the degree of interference of radio waves is reduced, and it is recognized that the radio frequency interference may be reduced.

In the wireless communication apparatus 1A illustrated in FIGS. 1A and 1B, an example has been illustrated in which the first passage portion 106D is formed on the third plate portion 106C opposed to the front surface 101*c* and the second passage portion 107D is formed on the third plate portion 107C opposed to the front surface 101*c*. Even according to such configuration, the first passage portion 106D and the second passage portion 107D are not opposed to each other, such that a similar effect as the wireless communication apparatus 1Asc illustrated in FIGS. 7A and 7B is considered to be achieved.

Figure 9:
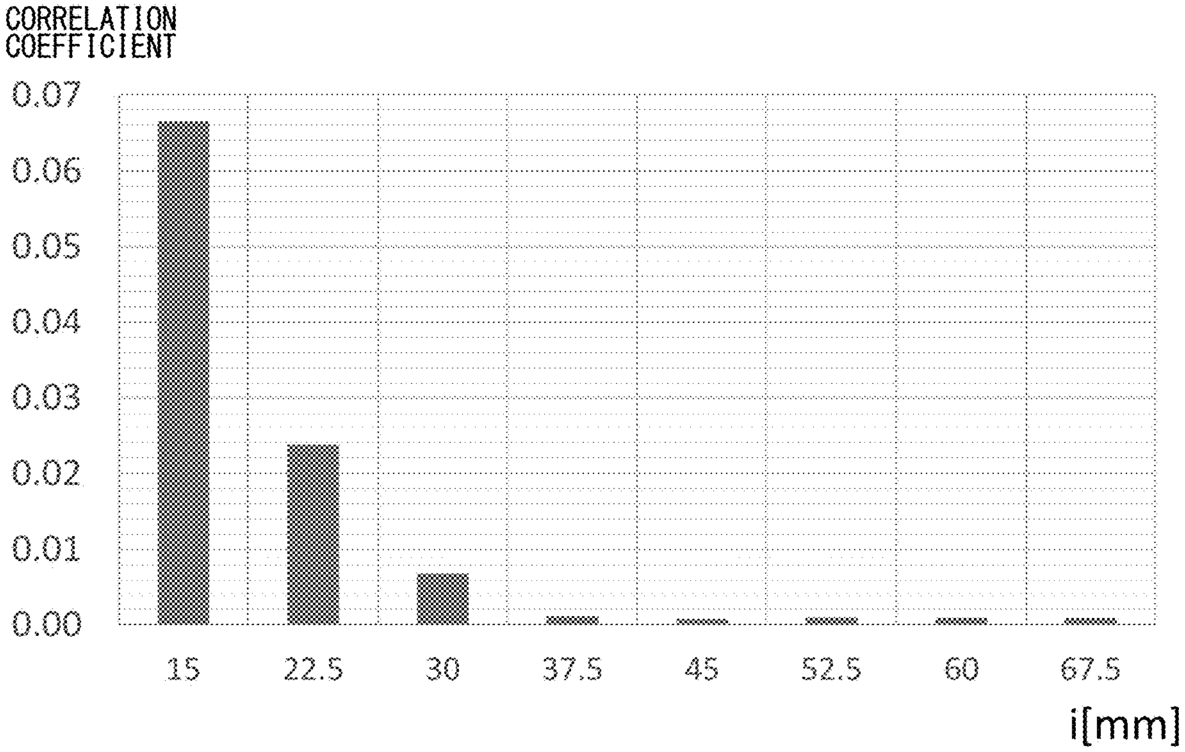
FIG. 9 is a view illustrating a simulation result of a relationship between a separated distance between a first opening and a second opening and a correlation coefficient of the degree of interference of radio waves.

Simulation of a Case where the Separated Distances of the First Opening and the Second Opening are Varied Next, a difference in radio frequency interference of a case where the separated distance between the first opening 104A and the second opening 105A is varied will be described with reference to the drawings. FIG. 9 is a view illustrating a simulation result of a relationship between a separated distance between a first opening and a second opening and a correlation coefficient of the degree of interference of radio waves.

As illustrated in FIG. 7A, on the front surface 101*c* of the casing 101, the distance between the first opening 104A and the second opening 105A is separated by a separated distance i. That is, the distance between an end portion of the side of the first opening 104A close to the second opening 105A and an end portion of the side of the first opening 104A close to the second opening 105A is the separated distance i. FIG. 9 illustrates the result of simulation of a case where the second opening 105A is moved in the X direction in the simulation model, that is, where the distance between the first opening 104A and the second opening 105A is approximated or separated to vary the separated distance i. According to this simulation, the frequency is set to 2.4 [GHz], and the dimension d2 of the first passage portion 106D and the second passage portion 107D is set to 22.5 [mm], which is smaller than ¼ the wavelength λ. Therefore, the radio frequency interference through the first passage portion 106D and the second passage portion 107D may be approximately suppressed.

As illustrated in FIG. 9, in a case where the separated distance i between the first opening 104A and the second opening 105A for irradiating radio waves is small, or close, the radio waves emitted from one opening induces electromagnetic coupling with the other opening, and resonance occurs at the other opening. The resonance causes interference of mutual radio waves at a vicinity of the opening at the exterior of the casing 101. Therefore, in order to suppress the radio frequency interference, the separated distance i is set greater than 30 [mm] which is ¼ the wavelength λ or greater, and it is recognized that the effect to suppress the radio frequency interference may be enhanced by preferably setting the separated distance i to 37.5 [mm] or greater.

According to this simulation, the first opening and the second opening are arranged on the same surface of the casing 101, but for example, a sufficient distance may be ensured by arranging the second opening on a different surface.

Figure 21:
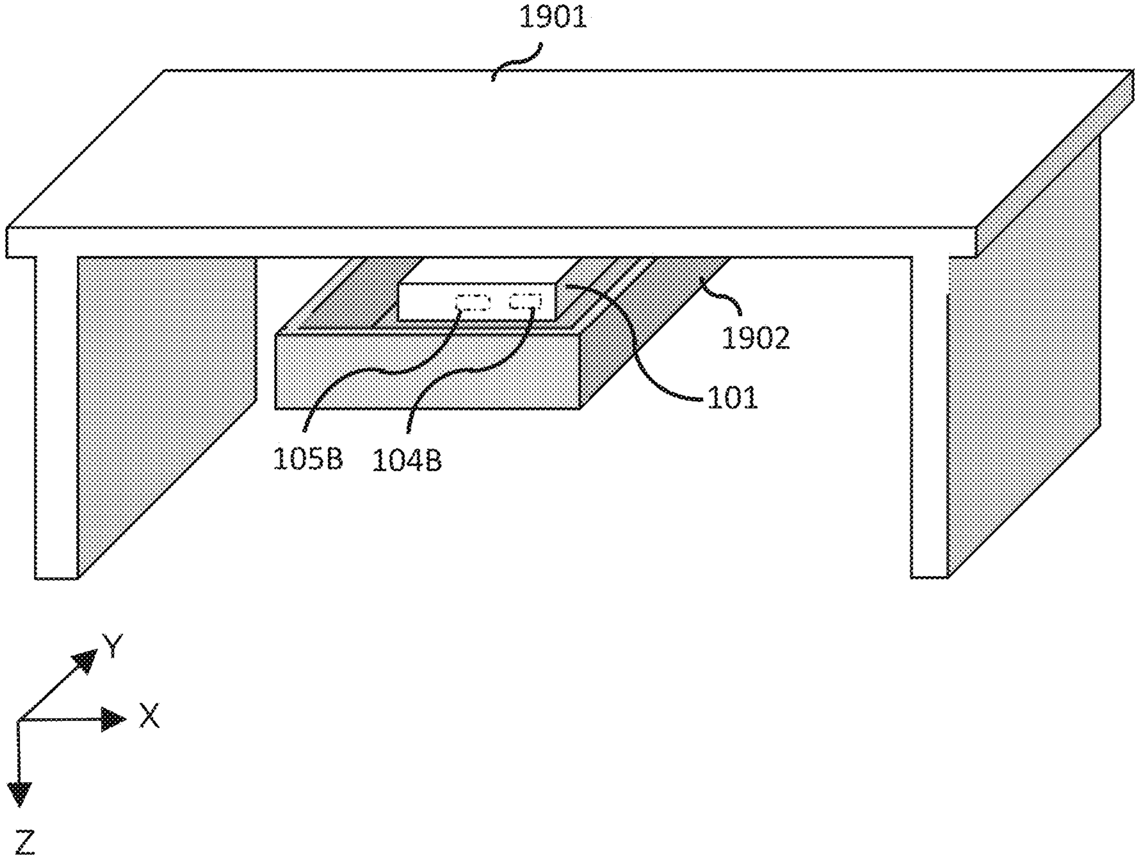
FIG. 21 is a view illustrating a state in which the wireless communication apparatus is accommodated in a bucky of an examination table.

Configuration of Interior of Casing for Suppressing Interference at Exterior of Casing when Stored in Bucky As illustrated FIG. 21, the wireless communication apparatus 1 may have the casing 101 stored in an examination table 1901 and used. The casing 101 of the wireless communication apparatus 1 may be stored in a metal frame 1902, which is so-called a bucky, that may be drawn out in the Y direction, and fixed thereto. In this case, the first openings 104A and 105A, i.e., the first opening 104A and the second opening 105A which are disposed on an opposite side from the X-ray sensor will be shielded by a bottom surface of the metal frame. Further, the second openings 104B and 105B, i.e., the third opening 104A and the forth opening 105B, are disposed such that a side wall of the metal frame is arranged on a XZ plane at a front side of the openings, and a bottom surface of the metal frame is arranged on a XY plane at a +Z axis direction of the openings. Since the openings are disposed in a manner surrounded by the metal frame, when the bucky is stored, the radio waves are propagated at the exterior of the casing 101 between the casing and the metal frame, and the amount of radio frequency interference is increased.

Figure 22A:
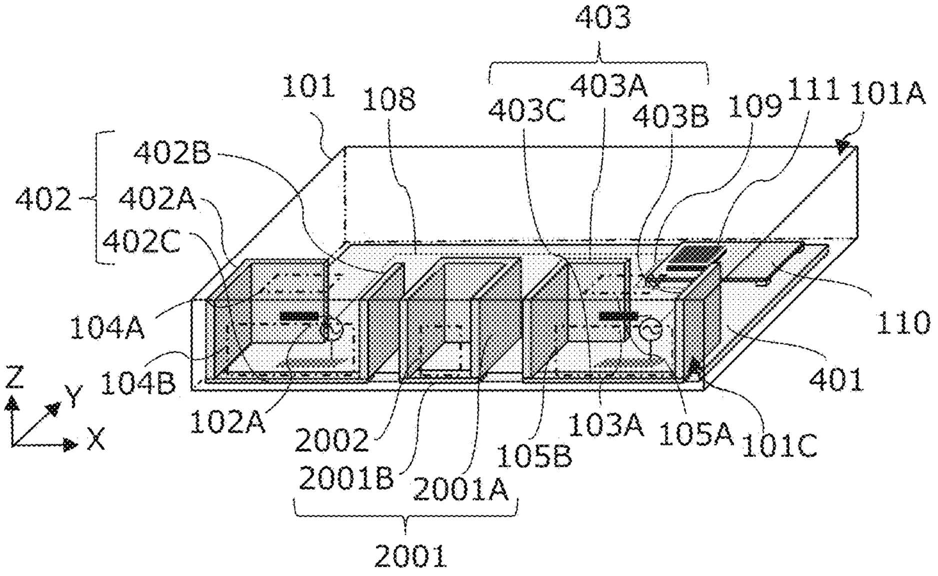
FIG. 22A is a perspective view illustrating an interior of a wireless communication apparatus in a case where a third surrounding portion is disposed between a first surrounding portion and a second surrounding portion.
Figure 22B:
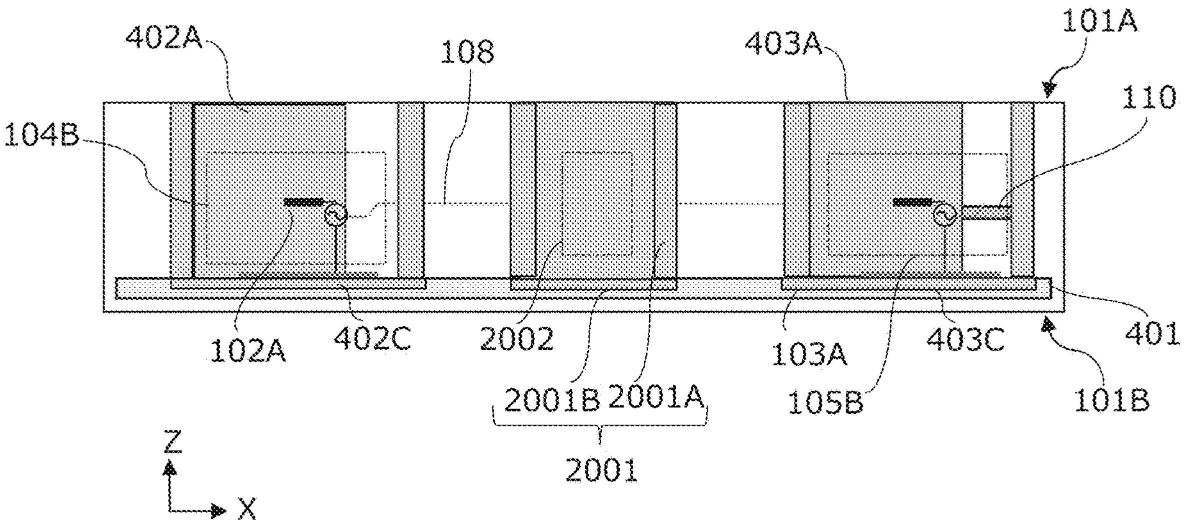
FIG. 22B is a side view of the apparatus of FIG. 22A.

In order to suppress the radio frequency interference at the exterior of the casing when the bucky is stored, as illustrated in FIG. 22, a third opening 2002, i.e., a fifth opening, is provided on the casing 101, and a third surrounding portion 2001 formed of a conductor is disposed in the interior of the casing 101 so as to surround the third opening 2002. An interior of the third surrounding portion is electrically shielded from an interior space of the casing 101. Further, the dimension of the interior space of the third surrounding portion is set to a dimension that causes a cavity resonance to occur at a frequency band used for wireless communication. There is no need to provide a gap as in the first passage portion 106D to the third surrounding portion. Furthermore, if a conductor is present at the right and left sides, i.e., X axis direction, of the third opening 2002, as in the case of a first surrounding portion 402B and a second surrounding portion 403A of FIG. 22, a certain effect may be achieved even if the third surrounding portion 2001 is not provided.

Figure 23A:
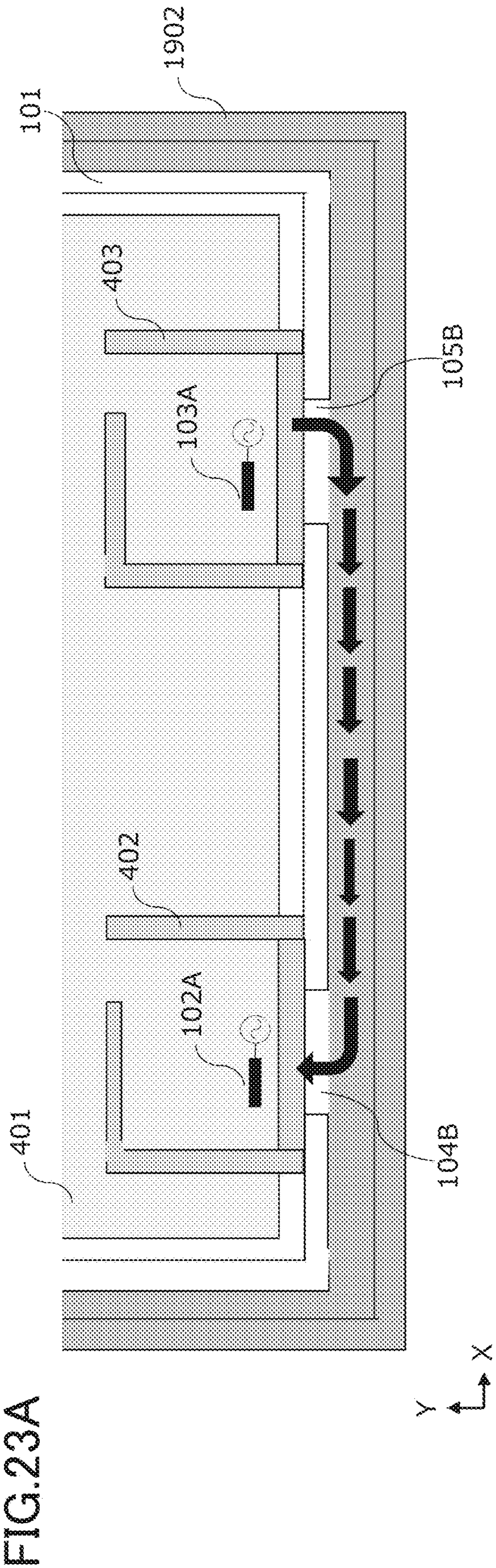
FIG. 23A is a view illustrating a flow of radio waves in a case where the third surrounding portion is not provided.
Figure 23B:
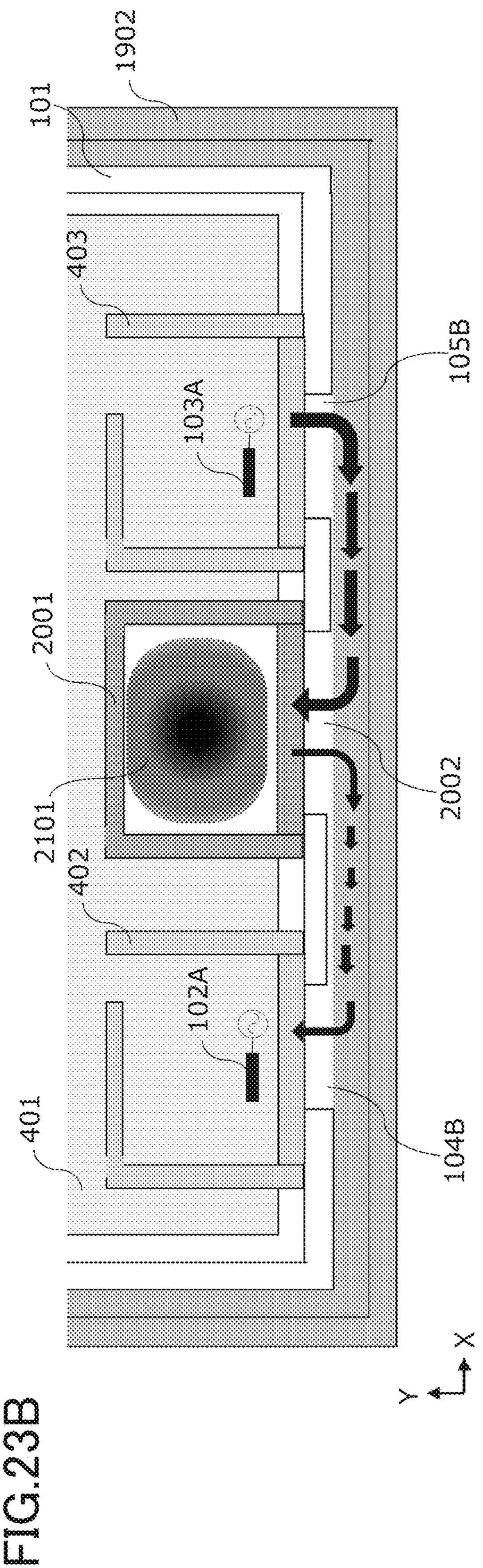
FIG. 23B is a view illustrating a flow of radio waves in a case where the third surrounding portion is provided.

The effect of providing the third surrounding portion 2001 will be described with reference to FIGS. 23A and 23B. As illustrated in FIG. 23A, if the third surrounding portion 2001 is not provided, the space between the side surface of the casing 101 and the side wall of the metal frame 1902 serves as a propagation path through which the radio waves output from the second antenna 103 are propagated as illustrated by the arrow, interfering with the first antenna 102. Meanwhile, if the third surrounding portion 2001 is provided, as illustrated in FIG. 23B, the radio waves output from the second antenna 103 enter through the third opening 2002 into the interior of the third surrounding portion 2001 and are reflected on the wall surfaces of the third surrounding portion 2001. If the dimension of the third surrounding portion 2001 is set to a dimension to cause cavity resonance, the incident waves are superposed with the reflected waves and become stationary waves as denoted by 2101, such that the radio waves are not propagated and stay within the space. As a result, radio waves that are leaked through the third opening 2002 is reduced, and the interference of the first antenna 102 may be suppressed significantly. The frequency f that the cavity resonance generates is expressed by the following Expression 1.

$$f = \frac{\sqrt{\left(\frac{m}{2 \times x1}\right)^2 + \left(\frac{n}{2 \times y1}\right)^2 + \left(\frac{p}{2 \times z1}\right)^2}}{\sqrt{\varepsilon_r \varepsilon_0 \mu_0}} \quad \text{Expression 1}$$

In Expression 1, x1, y1, and z1 are dimensions of the interior of the third surrounding portion, and m, n, and p indicate number of waves, which are maximum numerical values of waves of the electric field or magnetic field formed as stationary waves within the interior of the space. Further, εr represents a relative dielectric constant within the space, ε0 represents a dielectric constant of vacuum, and μ0 represents a magnetic permeability of vacuum.

Figure 24:
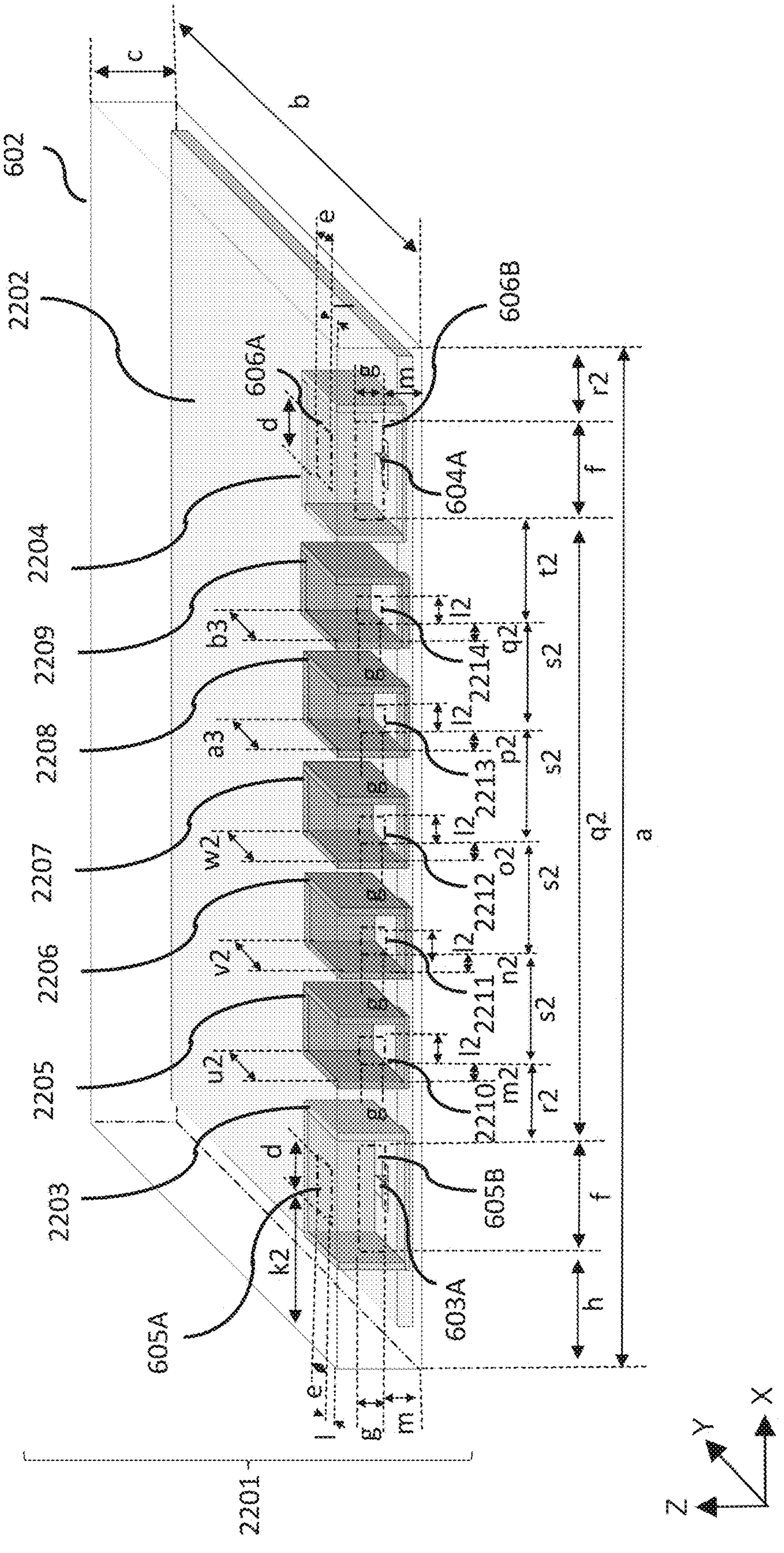
FIG. 24 is a perspective view illustrating an interior of a wireless communication apparatus in a case where a plurality of third surrounding portions are disposed between the first surrounding portion and the second surrounding portion.
Figure 25A:
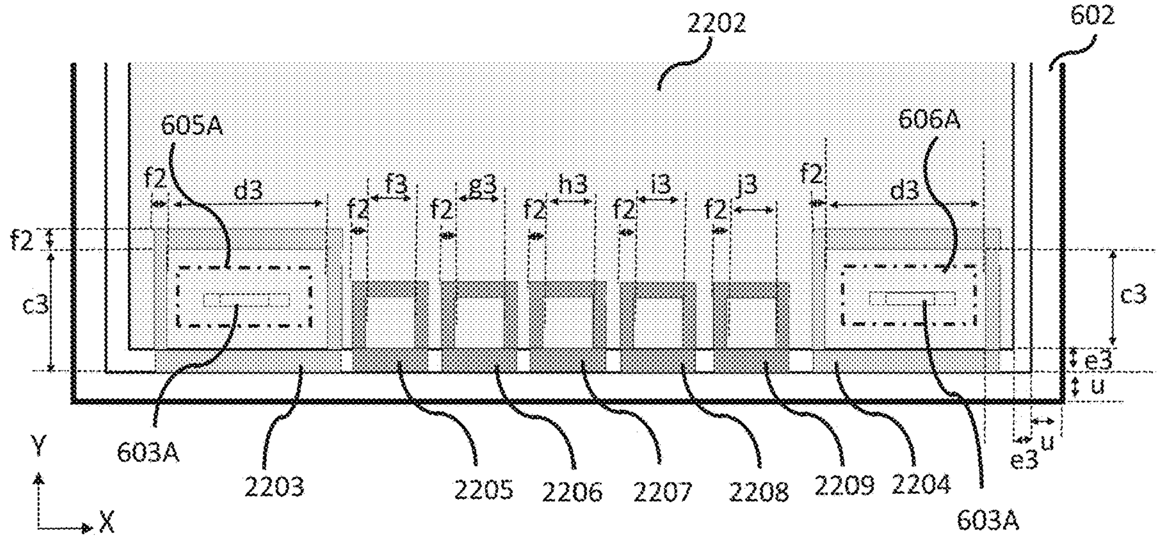
FIG. 25A is a side view of the apparatus of FIG. 24.
Figure 25B:
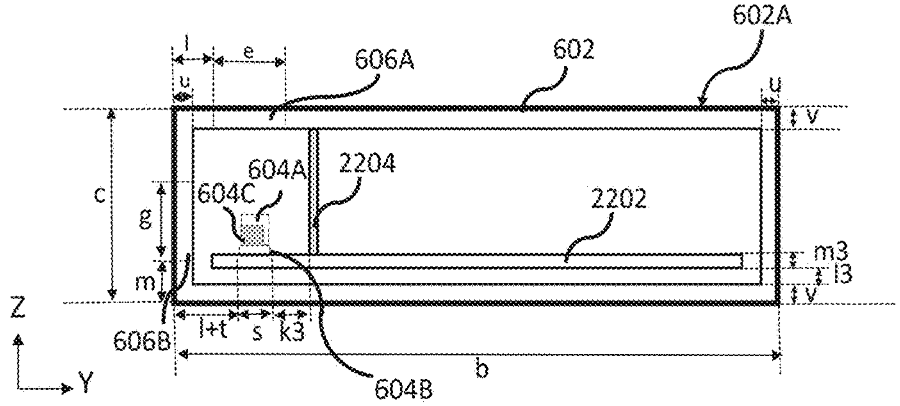
FIG. 25B is a side view of the apparatus of FIG. 24 illustrated in a direction that differs from the direction of FIG. 25A.
Figure 25C:
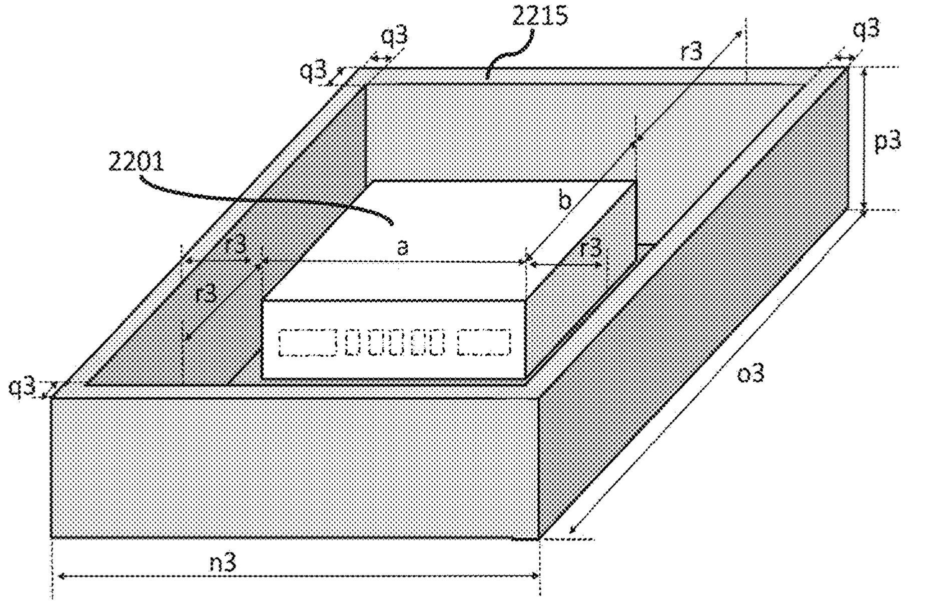
FIG. 25C is a view illustrating the wireless communication apparatus accommodated in a bucky.

Simulation of a Case where a Plurality of Third Surrounding Portions are Disposed Next, a simulation of a case where a plurality of third surrounding portions are disposed will be described. FIG. 24 and FIGS. 25A to 25C are each a simulation model that illustrates an effect of suppressing interference at the exterior of the casing by providing a plurality of third surrounding portions 2205 to 2209 in a case where an X-ray imaging apparatus 2201 is stored in the bucky. A first surrounding portion 2203 and a second surrounding portion 2204 are disposed in the interior of the X-ray imaging apparatus 2201, and five third surrounding portions 2205 to 2209 are disposed therebetween. Five third openings 2210 to 2214 are disposed between a first opening 605B and a second opening 606B. Further, as illustrated in FIG. 24D, a surface 602A of the X-ray imaging apparatus 2201 is arranged to fit to a surface of the bucky. A first opening 605A and a second opening 606A are in a state covered by the surface of the bucky (also refer to FIG. 25C). The dimensions of the present model are indicated in Table 3.

TABLE 3

Dimensions of Simulation Model

| | k2 | l2 | m2 | n2 | o2 | p2 | q2 | r2 |
|---|---|---|---|---|---|---|---|---|
| DIMENSION [mm] | 51 | 27.2 | 1.0 | 2.3 | 3.25 | 3.25 | 3.25 | 34.6 |
| | s2 | t2 | u2 | v2 | w2 | a3 | b3 | c3 |
| DIMENSION [mm] | 15 | 62.57 | 53.2 | 57.0 | 45.5 | 45.0 | 49.0 | 43.0 |
| | d3 | e3 | f3 | g3 | h3 | i3 | j3 | k3 |
| DIMENSION [mm] | 110.0 | 5.0 | 29.2 | 31.8 | 29.2 | 30.8 | 30.8 | 21.1 |
| | l3 | m3 | n3 | o3 | p3 | q3 | r3 | |
| DIMENSION [mm] | 1.5 | 1.5 | 474.0 | 474.0 | 18.5 | 2.0 | 5.0 | |

In this simulation, the dimensions of the third surrounding portions 2205 to 2209 are varied so as to suppress interference of frequency of a 5 GHz band of a Wi-fi (5.18 to 5.32 GHz, and 5.5 to 5.845 GHz). The resonance frequency and dimensions of each of the third surrounding portions 2205 to 2209 calculated using Expression (1) will be shown in Table 4.

TABLE 4

Resonance Frequency and Dimension of Third Surrounding Portion

| | 2205 | 2206 | 2207 | 2208 | 2209 |
|---|---|---|---|---|---|
| RESONANCE FREQUENCY [GHz] | 5.64 | 5.25 | 5.8 | 5.55 | 5.72 |
| DIMENSION (x DIRECTION) [mm] | 29.2 | 31.8 | 29.2 | 30.8 | 30.8 |
| DIMENSION (y DIRECTION) [mm] | 53.2 | 57.0 | 45.5 | 45.0 | 49.0 |
| DIMENSION (z DIRECTION) [mm] | 8.5 | 8.5 | 8.5 | 8.5 | 8.5 |

Figure 26A:
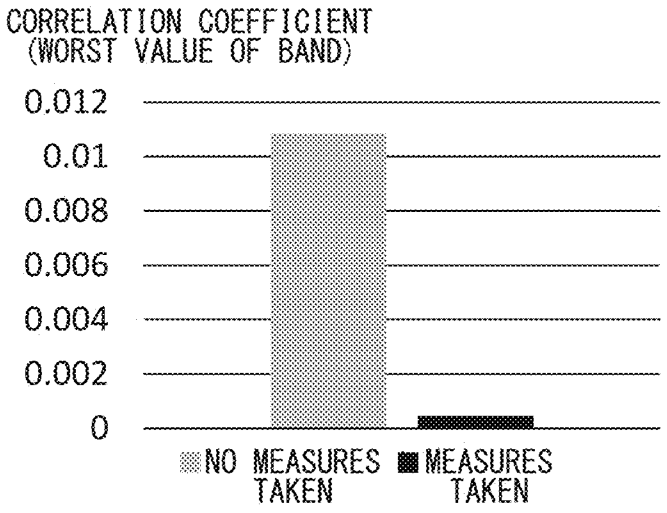
FIG. 26A is a graph illustrating a correlation coefficient between a case where the third surrounding portion is provided and a case where the third surround portion is not provided.
Figure 26B:
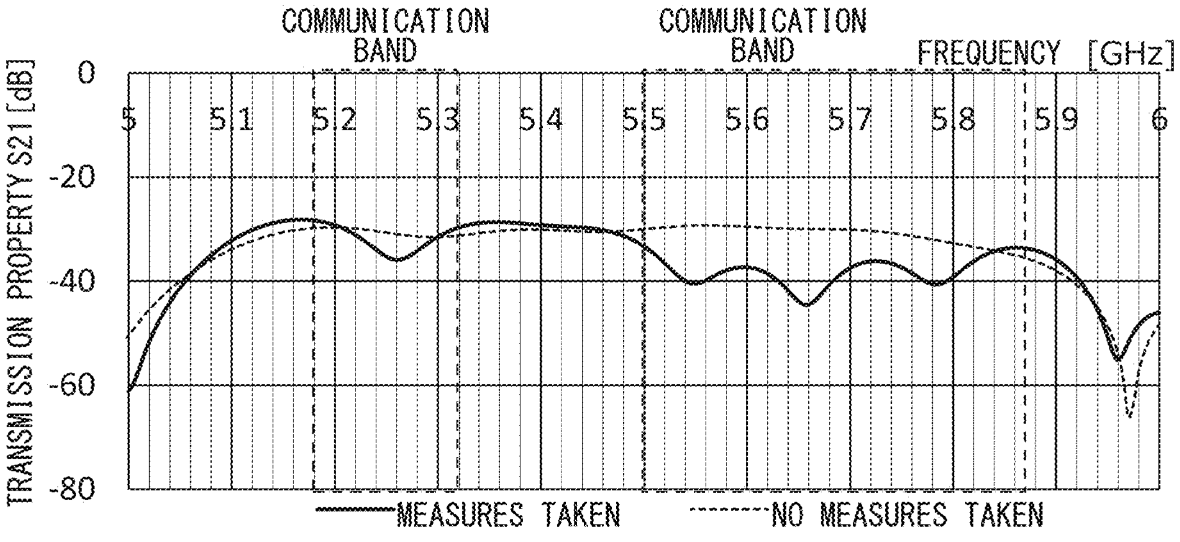
FIG. 26B is a graph illustrating transmission characteristics of radio waves in a case where the third surrounding portion is provided and in a case where the third surrounding portion is not provided.

FIGS. 26A and 26B illustrate a comparison result between the presence and absence of the third surrounding portions 2205 to 2209, wherein the providing of the third surrounding portions may also be referred to as measures taken, and the absence of the third surrounding portions may also be referred to as no measures taken. As illustrated in FIG. 26A, when the worst values of the correlation coefficient are compared in the 5 GHz band, it can be recognized that by providing the third surrounding portions 2205 to 2209, the correlation coefficient may be reduced and the interference outside the casing may be suppressed. The results of the effects of each of the third surrounding portions are as illustrated in FIG. 26B, and it can be recognized that the amount of transmission of radio waves is reduced in different resonance frequencies in the third surrounding portions 2205 to 2209. As described, it is desirable that the dimensions of the third surrounding portions 2205 to 2209 in the x, y, and z directions, i.e., dimensions a3, b3, and c3, set so that the frequency f calculated using the above-mentioned Expression 1 are set to dimensions within the range of the frequency band of the radio signal. Especially in the case where at least any one of m, n and p which are number of waves of expression 1 is an integer greater than 1, it is preferable that the dimensions are set so that the frequency f is within the range of the frequency band of the radio signal.

Figure 27A:
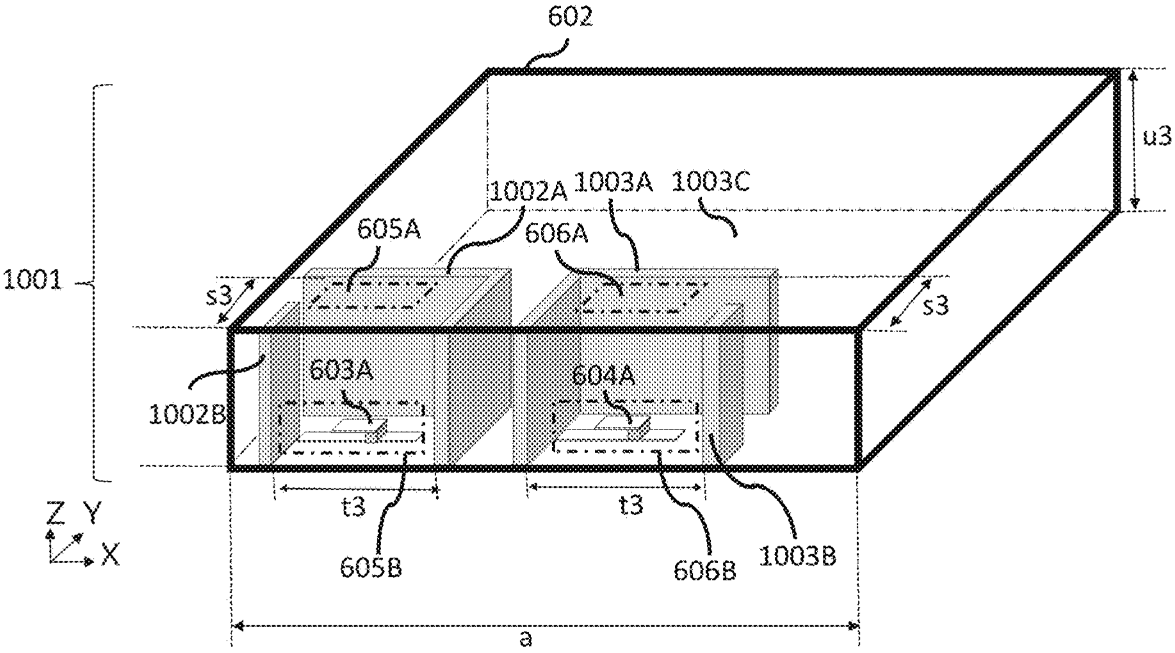
FIG. 27A is a view illustrating dimensions that affect radiation efficiency to a simulation model of the wireless communication apparatus of FIG. 7A.
Figure 27B:
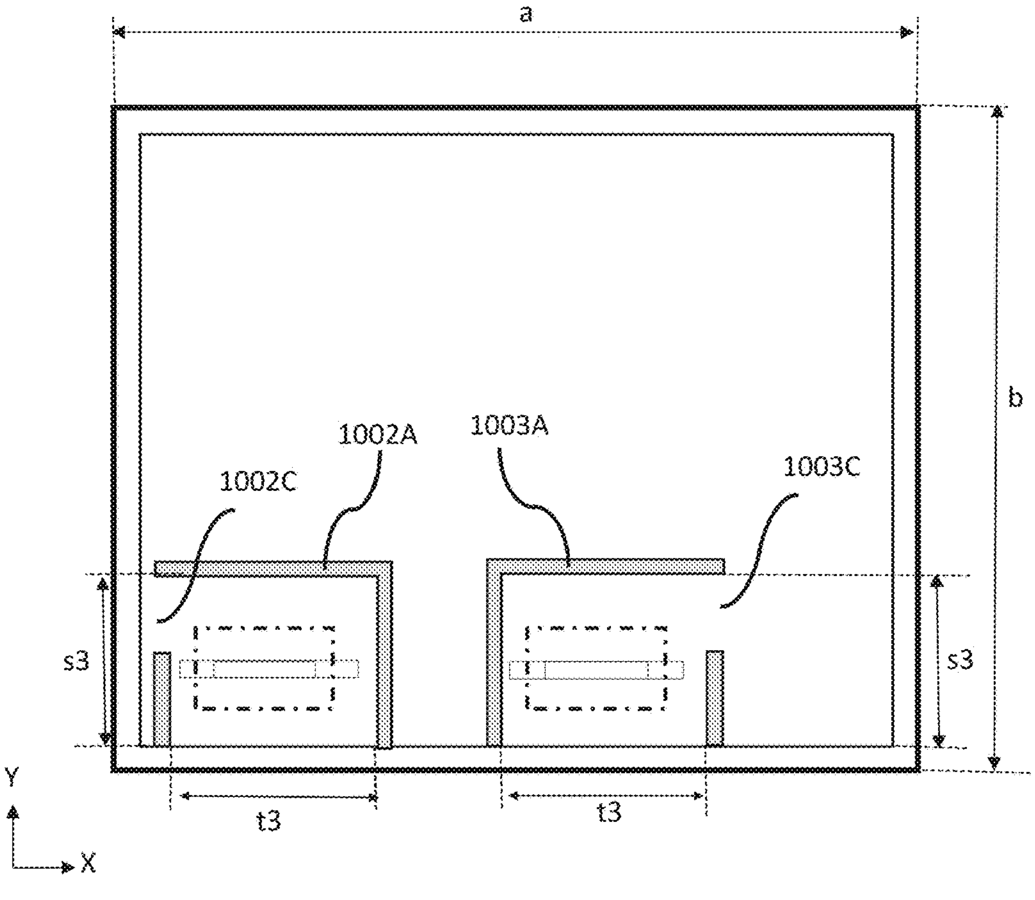
FIG. 27B is a view illustrating dimensions that affect radiation efficiency to a simulation model of the wireless communication apparatus of FIG. 7B.

Simulation of Radiation Efficiency in a Case where the Volume of the Surrounding Structure is Varied Next, an example is described of a case where the radiation efficiency is varied when the dimensions of the first surrounding portion 106 and the second surrounding portion 107 are varied. FIGS. 27A and 27B only show dimensions s3, t3, and u3, that affect the radiation efficiency, with respect to FIG. 7. The dimensions s3, t3, and u3 respectively correspond to dimensions d2+e2–u, b2, and c of FIG. 7. Further, the dimensions s3, t3, and u3 respectively correspond to dimensions y1, x1, and z1 of Expression 1 described above. In other words, the dimension s3 may be referred as a dimension in a direction of extension of the first plate portion having one end connected to the first side surface, the dimension t3 may be referred to as a dimension in a direction of extension of the first side surface, and the dimension u3 may be referred to as a dimension in the thickness direction. The value s3×t3×u3 corresponds to a volume of an interior space of the surrounding portion in the first surrounding portion 106 and the second surrounding portion 107. The radiation efficiency increases when a cavity resonance is generated in the interior of the first surrounding portion 106 and the second surrounding portion 107.

During non-resonance, the radio waves emitted from the antennas travel and are reflected repeatedly on the wall surface of the surrounding portion, but during resonance, stationary waves are generated in the interior of the first and second surrounding portions 106 and 107, and the amplitude of radio waves are doubled. As a result, the radiation efficiency is enhanced. In this example, radiation efficiencies are compared among a dimension A where no cavity resonance occurs in the 5 GHz band, which is a communication band of Wi-fi, and dimensions B, C, and D where cavity resonance occur. The results having computed the respective dimensions using Expression 1 are shown in Table 5.

Figure 28:
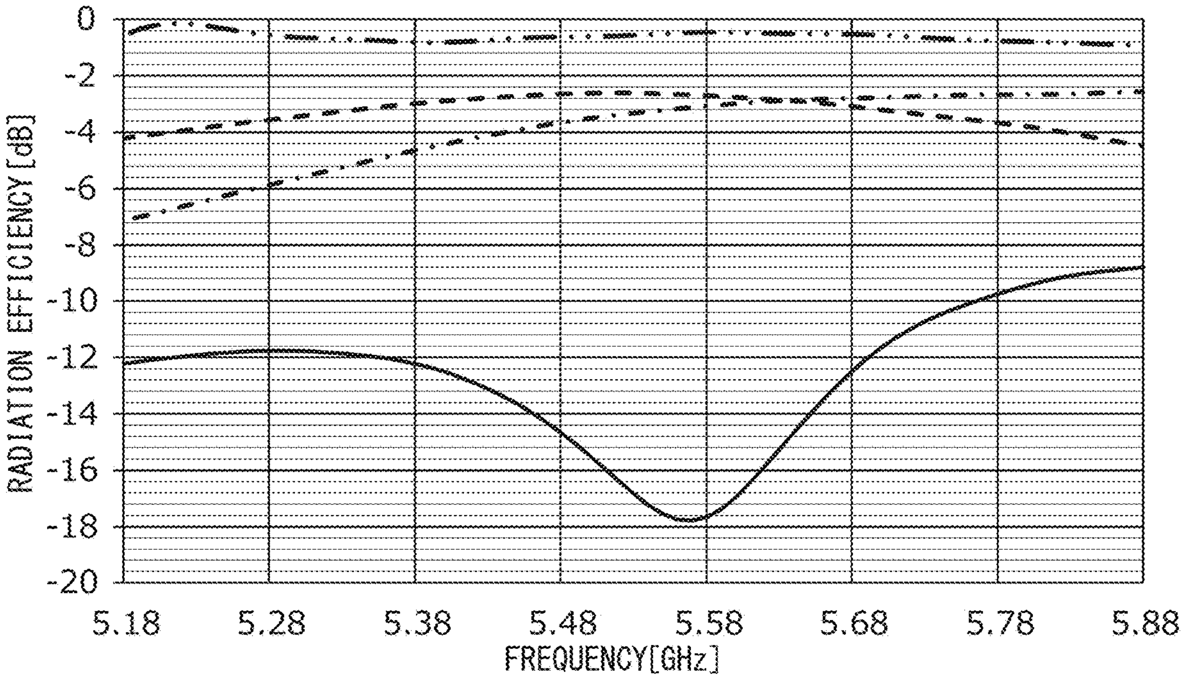
FIG. 28 is a graph illustrating frequency characteristics of radiation efficiency.

FIG. 28 shows a frequency characteristics of radiation efficiency according to respective dimensions. In the drawing, dimension A is illustrated by a solid line, dimension B is illustrated by a dotted line, dimension C is illustrated by a dashed-dotted line, and dimension D is illustrated by a two dotted dashed line. According to dimension A, the radiation efficiency is significantly deteriorated around 5.58 GHz, whereas according to dimensions B, C, and D, no such significant deterioration occurs compared to dimension A. Based on the above, the radiation efficiency may be enhanced by setting the dimensions of the first and second surrounding portions 106 and 107 to a dimension that causes cavity resonance at the communication frequency band. That is, the dimensions s3, t3, and u3 of the first surrounding portion 106 and the second surrounding portion 107 are desirably set to dimensions in which the frequency f calculated by Expression 1 mentioned above falls within the range of the frequency band of the radio signal. Specifically, in a case where at least any one of m, n, and p which are the number of waves of Expression 1 is an integer greater than 1, it is preferable that the dimension is set such that the frequency f falls within the range of the frequency band of the radio signal.

The dimension D has a higher radiation efficiency compared to dimensions B and C. This is related to the magnitude of a quality factor, i.e., Q-value, which is a coefficient showing the smallness of power loss by resonance in a resonance circuit, as indicated in the expression (11.1) on page 133 of "Introduction to Microwaves" (Toshi Tateno, Denpa Shinkou Kai, 1983). Q-value is represented by a ratio of power accumulated in the circuit and power that is lost.

Expression (11.1)

$$Q = \omega_0 \frac{\text{(ENERGY STORED IN CIRCUIT)}}{\text{(ENERGY CONSUMED IN CIRCUIT)}} = \omega_0 \frac{U}{P} = 2\pi \frac{\text{(STORED ENERGY)}}{\text{(ENERGY CONSUMED DURING ONE PERIOD)}} \tag{11.1}$$

TABLE 5

| Dimensions of First and Second Surrounding Portions | | | | | | |
|---|---|---|---|---|---|---|
| | DIMENSION s3[mm] | DIMENSION t3[mm] | DIMENSION u3[mm] | NUMBER OF WAVES (m, n, p) | RESONANCE FREQUENCY [GHz] | COMPARED TO COMMUNICATION BAND |
| DIMENSION A | 43.3 | 88.6 | 8.5 | (2, 1, 0) | 4.84 | OUT OF BAND |
| DIMENSION B | 30.0 | 70.0 | 8.5 | (1, 1, 0) | 5.44 | WITHIN BAND |
| DIMENSION C | 40.0 | 76.0 | 8.5 | (2, 1, 0) | 5.44 | WITHIN BAND |
| DIMENSION D | 40.0 | 114.0 | 8.5 | (3, 1, 0) | 5.44 | WITHIN BAND |

Dimensions B, C, and D are set to dimensions that cause resonance at 5.44 GHz as a substantial center of frequencies within the range of the 5 GHz band from 5.18 GHz to 5.845 GHz. By causing resonance approximately at the center of frequencies, the radiation efficiency of the entire 5 GHz band may be enhanced compared to a case where resonance is realized by an upper limit frequency or a lower limit frequency of the band. Meanwhile, as for dimension A, the dimension is set such that resonance is realized at 4.84 GHz which is outside the 5 GHz band.

If the Q-value is high, the power loss within the surrounding portion is small, such that the radiation efficiency becomes high, and if the Q-value is low, the power loss within the surrounding portion is high, such that the radiation efficiency becomes small. From expression (11.2), if the frequency is fixed and the skin depth is not varied, the Q-value becomes high as the ratio of the capacity of the cavity and the surface area of the inner wall becomes high, such that the radiation efficiency may be increased by setting the dimension t3 to a large dimension D.

Expression (11.2)

$$Q \propto \frac{(\text{MAGNETIC FLUX DENSITY})^2 \times (\text{CAVITY VOLUME})}{(\text{SKIN DEPTH}) \times (\text{MAGNETIC FLUX DENSITY})^2 \times (\text{SURFACE AREA OF INNER WALL OF CAVITY})} = \frac{(\text{VOLUME})}{(\text{SKIN DEPTH}) \times (\text{SURFACE AREA OF INNER WALL})} \tag{11.2}$$

The present simulation is illustrated with respect to a 5 GHz-band for a Wi-fi, but the radiation efficiency may also be enhanced in the range of a 2.4 GHz band (2.412 GHz to 2.484 GHz) for a Wi-fi by setting the dimension to realize cavity resonance in the communication frequency band.

Figure 10A:
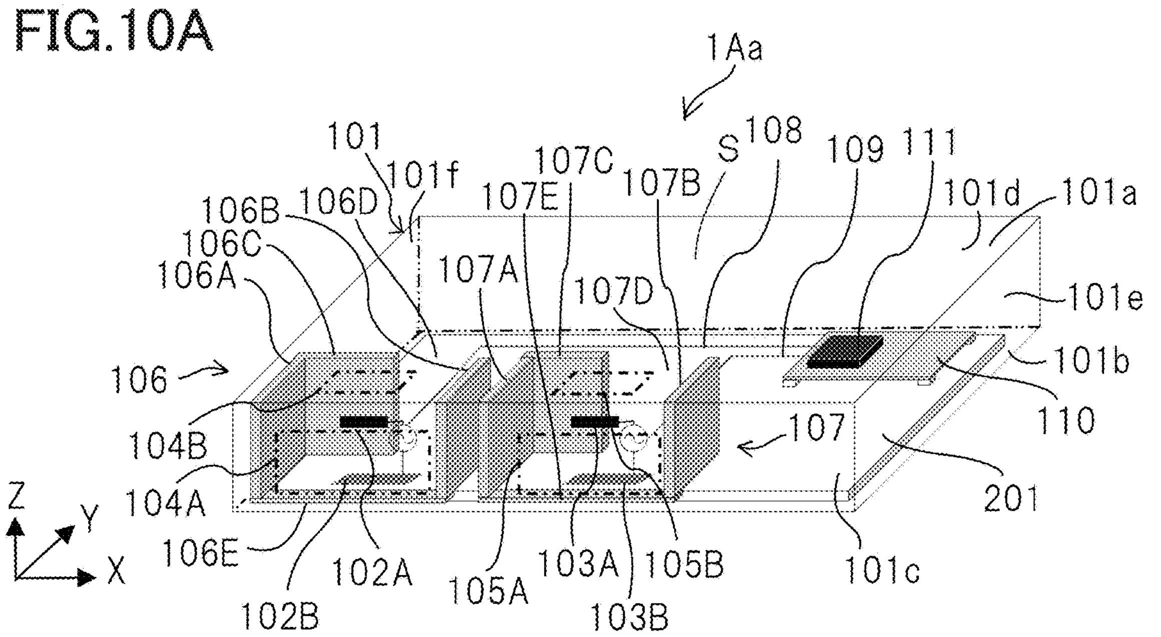
FIG. 10A is a perspective view illustrating in perspective an interior of the wireless communication apparatus in which a first surrounding portion and a second surrounding portion are fixed to a support plate on which a first antenna, a second antenna, and a control board are supported.
Figure 10B:
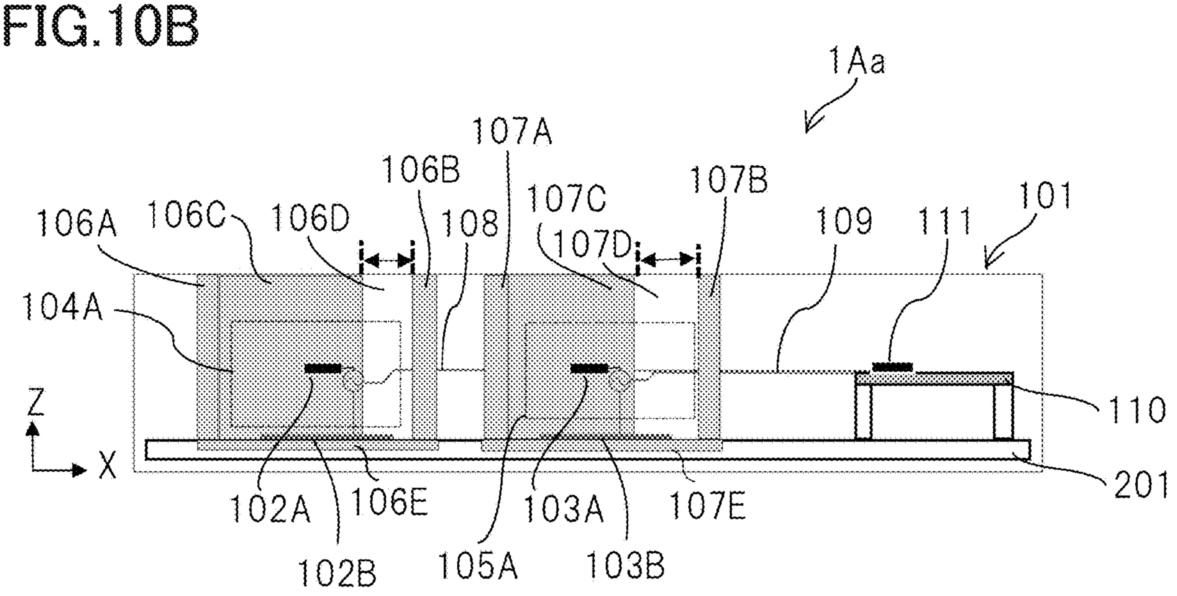
FIG. 10B is a side view of the apparatus of FIG. 10A.

In a Case where the First Surrounding Portion and the Second Surrounding Portion are Fixed to and Supported on a Support Plate Next, a wireless communication apparatus 1Aa serving as a modified example in which a part of the wireless communication apparatus 1A illustrated in FIG. 1 is modified will be described with reference to the drawings. FIG. 10A is a perspective view illustrating in perspective an interior of the wireless communication apparatus in which a first surrounding portion and a second surrounding portion are fixed to a support plate on which a first antenna, a second antenna, and a control board are supported. FIG. 10B is a side view illustrating in perspective an interior of the wireless communication apparatus in which a first surrounding portion and a second surrounding portion are fixed to a support plate on which a first antenna, a second antenna, and a control board are supported.

As illustrated in FIGS. 10A and 10B, the wireless communication apparatus 1Aa is equipped with the support plate 201 (refer to FIG. 18) that supports the printed circuit board 110, and the first surrounding portion 106 and the second surrounding portion 107 are fixed to and supported on the support plate 201.

In detail, the first surrounding portion 106 is equipped with a fourth plate portion 106E serving as a bottom plate, wherein the first plate portion 106A, the second plate portion 106B, and the third plate portion 106C are integrally fixed to the fourth plate portion 106E. Further, the fourth plate portion 106E is fixed to the support plate 201 in a manner embedded therein, and thereby, the first surrounding portion 106 is fixed on and supported by the support plate 201. Further, the first ground 102B of the first antenna 102 is supported on the fourth plate portion 106E.

Similarly, the second surrounding portion 107 is equipped with a fourth plate portion 107E serving as a bottom plate, wherein the first plate portion 107A, the second plate portion 107B, and the third plate portion 107C are integrally fixed to the fourth plate portion 107E. Further, the fourth plate portion 107E is fixed to the support plate 201 in a manner embedded therein, and thereby, the second surrounding portion 107 is fixed to and supported on the support plate 201. Further, the second ground 103B of the second antenna 103 is supported on the fourth plate portion 107E.

As described, by forming the first surrounding portion 106 and the second surrounding portion 107 in a box-like shape and assembling the same onto the support plate 201, the assembling performance may be enhanced. The other configurations are similar to the wireless communication apparatus 1A illustrated in FIGS. 1A and 1B, such that detailed descriptions thereof are omitted.

Figure 11A:
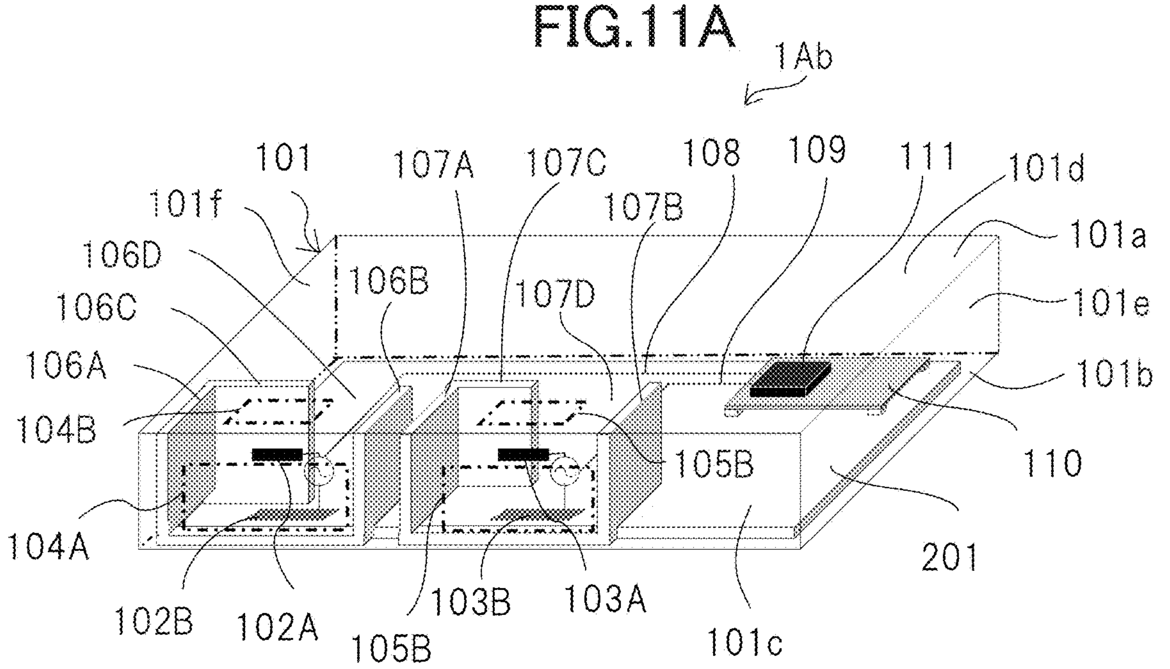
FIG. 11A is a perspective view illustrating in perspective an interior of the wireless communication apparatus in which a first surrounding portion and a second surrounding portion are formed integrally with a support plate on which a first antenna, a second antenna, and a control board are supported.
Figure 11B:
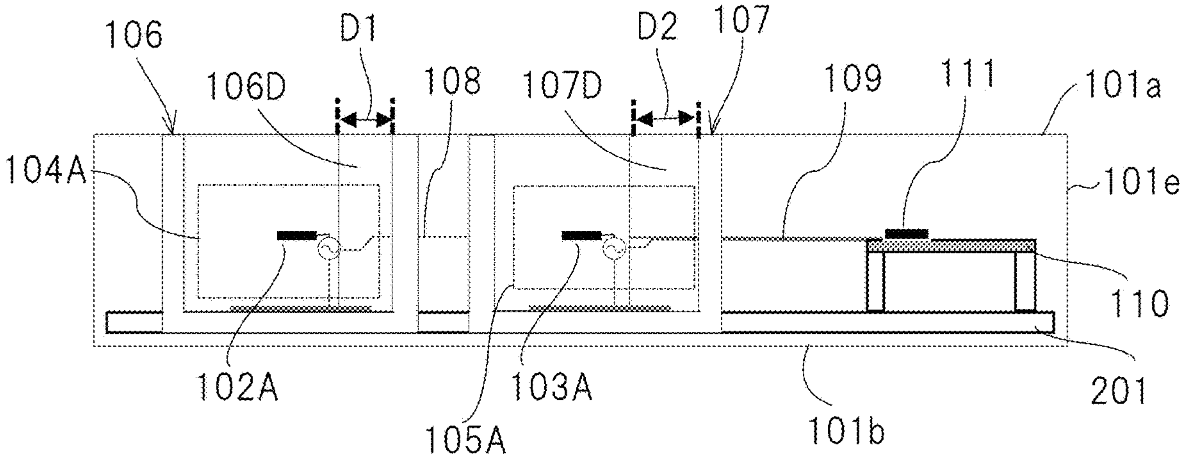
FIG. 11B is a side view of the apparatus of FIG. 11A.

In a Case where the First Surrounding Portion and the Second Surrounding Portion are Formed Integrally with the Support Plate Next, a wireless communication apparatus 1Ab serving as a modified example in which a part of the wireless communication apparatus 1A illustrated in FIG. 1 is modified will be described with reference to the drawings. FIG. 11A is a perspective view illustrating in perspective an interior of the wireless communication apparatus in which a first surrounding portion and a second surrounding portion are formed integrally with a support plate on which a first antenna, a second antenna, and a control board are supported. FIG. 11B is a side view illustrating in perspective an interior of the wireless communication apparatus in which a first surrounding portion and a second surrounding portion are formed integrally with a support plate on which a first antenna, a second antenna, and a control board are supported.

As illustrated in FIGS. 11A and 11B, the wireless communication apparatus 1Ab is equipped with the support plate 201 (refer to FIG. 18) that supports the printed circuit board 110, and the first surrounding portion 106 and the second surrounding portion 107 are formed integrally with the support plate 201.

In detail, the first plate portion 106A, the second plate portion 106B, and the third plate portion 106C of the first surrounding portion 106 are formed integrally with the support plate 201. Similarly, the first plate portion 107A, the second plate portion 107B, and the third plate portion 107C of the second surrounding portion 107 are formed integrally with the support plate 201.

As described, by forming the first surrounding portion 106 and the second surrounding portion 107 integrally with the support plate 201, the assembling property may be enhanced. The other configurations are similar to the wireless communication apparatus 1A illustrated in FIGS. 1A and 1B, such that detailed descriptions thereof are omitted.

Summary of First Embodiment

As described, the wireless communication apparatus 1A according to the first embodiment has the first antenna 102, the first opening 104A, and the third opening 104B surrounded by the first surrounding portion 106, and has the second antenna 103, the second opening 105A, and the fourth opening 105B surrounded by the second surrounding portion 107. Thereby, even though the apparatus is not equipped with the parasitic antenna element or the metal block as disclosed in WO2010/073429 A1, the radio frequency interference between the first antenna 102 and the second antenna 103 may be reduced. Furthermore, even if all six surfaces of the casing 101 are conductors, the radio frequency interference between the first antenna 102 and the second antenna 103 may be reduced.

Since the apparatus includes the first passage portion 106D and the second passage portion 107D, the wireless IC 111 and the first antenna 102 of the printed circuit board 110 may be connected by the first cable 108, and the wireless IC 111 and the second antenna 103 may be connected by the second cable 109. Then, even if the first passage portion 106D and the second passage portion 107D are formed on the first surrounding portion 106 and the second surrounding portion 107, the radio frequency interference may be reduced if the width of the first passage portion 106D and the second passage portion 107D is less than ½ the wavelength λ, or preferably ¼ or less.

Further, since the first passage portion 106D and the second passage portion 107D are arranged so as not to be disposed in opposition to each other, the radio frequency interference may be reduced, and the widths of the first passage portion 106D and the second passage portion 107D may be increased correspondingly. If the widths of the first passage portion 106D and the second passage portion 107D are great, the assembling property may be enhanced. The width of the first passage portion 106D and the second passage portion 107D is preferably 15 [mm] or greater, considering the operation performed by the operator to pass the first cable 108 and the second cable 109 therethrough.

The radio frequency interference may be reduced by separating the first opening 104A and the second opening 105A by a separated distance i of ¼ the wavelength λ or greater. In the simulation, the separated distance i between the first opening 104A and the second opening 105A is varied, but the separated distance between the third opening 104B and the fourth opening 105B is considered to be similar. That is, the radio frequency interference may be reduced by separating the third opening 104B and the fourth opening 105B by a separated distance which is ¼ the wavelength λ or greater.

Further, if the apparatus is equipped with the support plate 201, the assembling property may be enhanced by having the first surrounding portion 106 and the second surrounding portion 107 fixed to and supported on the support plate 201, or by forming the same integrally with the support plate 201.

Second Embodiment

Figure 12A:
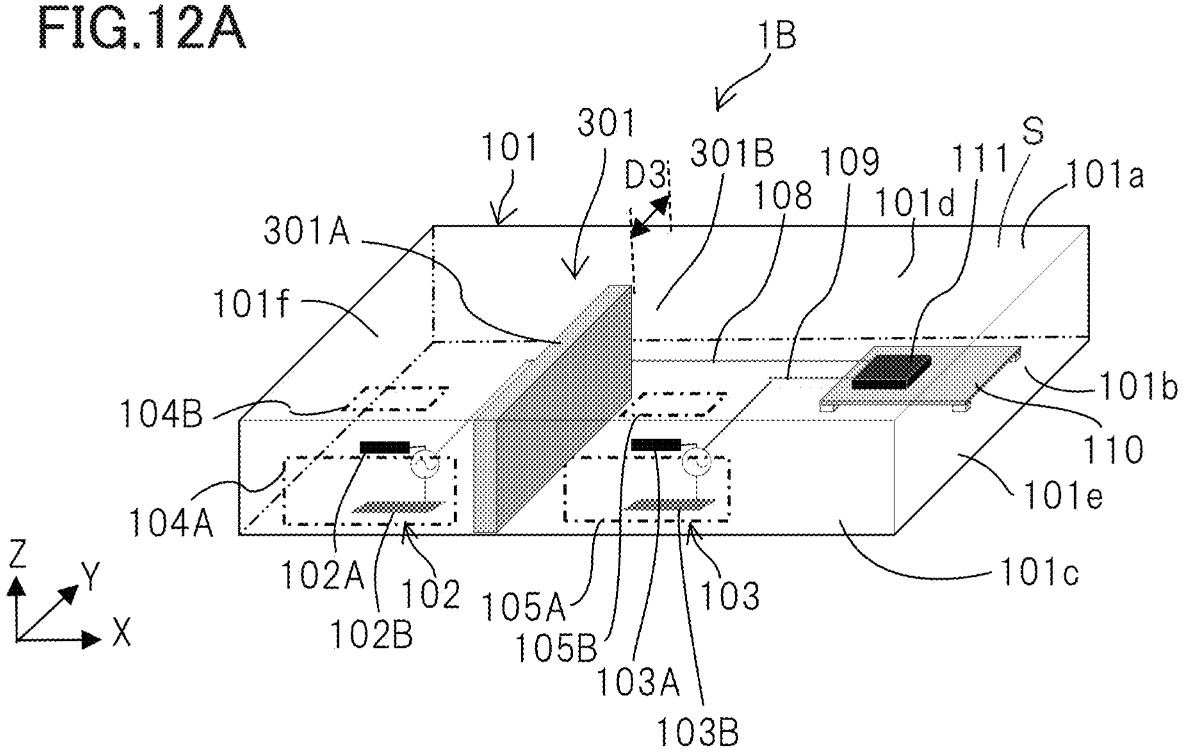
FIG. 12A is a perspective view illustrating in perspective an interior of a wireless communication apparatus according to a second embodiment.
Figure 12B:
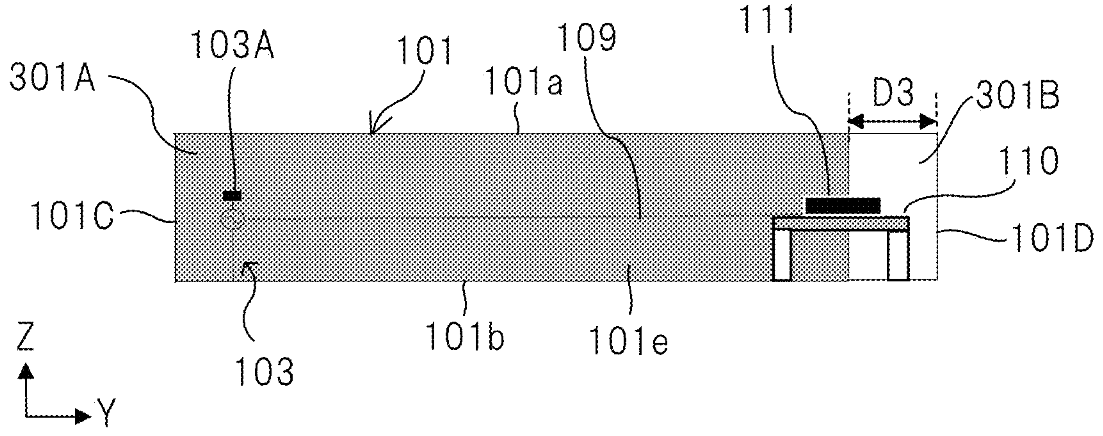
FIG. 12B is a side view illustrating the apparatus of FIG. 12A.

Next, a second embodiment in which a part of the first embodiment is varied will be described with reference to the drawings. FIG. 12A is a perspective view illustrating in perspective an interior of a wireless communication apparatus according to a second embodiment. FIG. 12B is a side view illustrating in perspective an interior of a wireless communication apparatus according to a second embodiment.

Configuration of Partition Plate

As illustrated in FIGS. 12A and 12B, a wireless communication apparatus 1B according to a second embodiment is equipped with a partition plate portion 301 having a partition plate 301A serving as the partition portion and a passage portion 301B, instead of the first surrounding portion 106 and the second surrounding portion 107. In the partition plate portion 301, the partition plate 301A is erected from the lower surface 101*b* and connected to the front surface 101*c*, forming the passage portion 301B therebetween with the rear surface 101*d*. The partition plate portion 301 is disposed in the interior space S of the casing 101, and partitions the first antenna 102, the first opening 104A, and the third opening 104B from the second antenna 103, the second opening 105A, and the fourth opening 105B so as to separate radio waves. The first cable 108 for connecting the wireless IC 111 on the printed circuit board 110 and the first antenna 102 is passed through the passage portion 301B.

A distance D3 of the width of the passage portion 301B is formed to be smaller than ½ the wavelength λ of radio waves output from the first antenna 102 and the second antenna 103, preferably ¼ the wavelength λ or smaller. Thereby, the radio frequency interference between the first antenna 102 and the second antenna 103 may be reduced.

Figure 13:
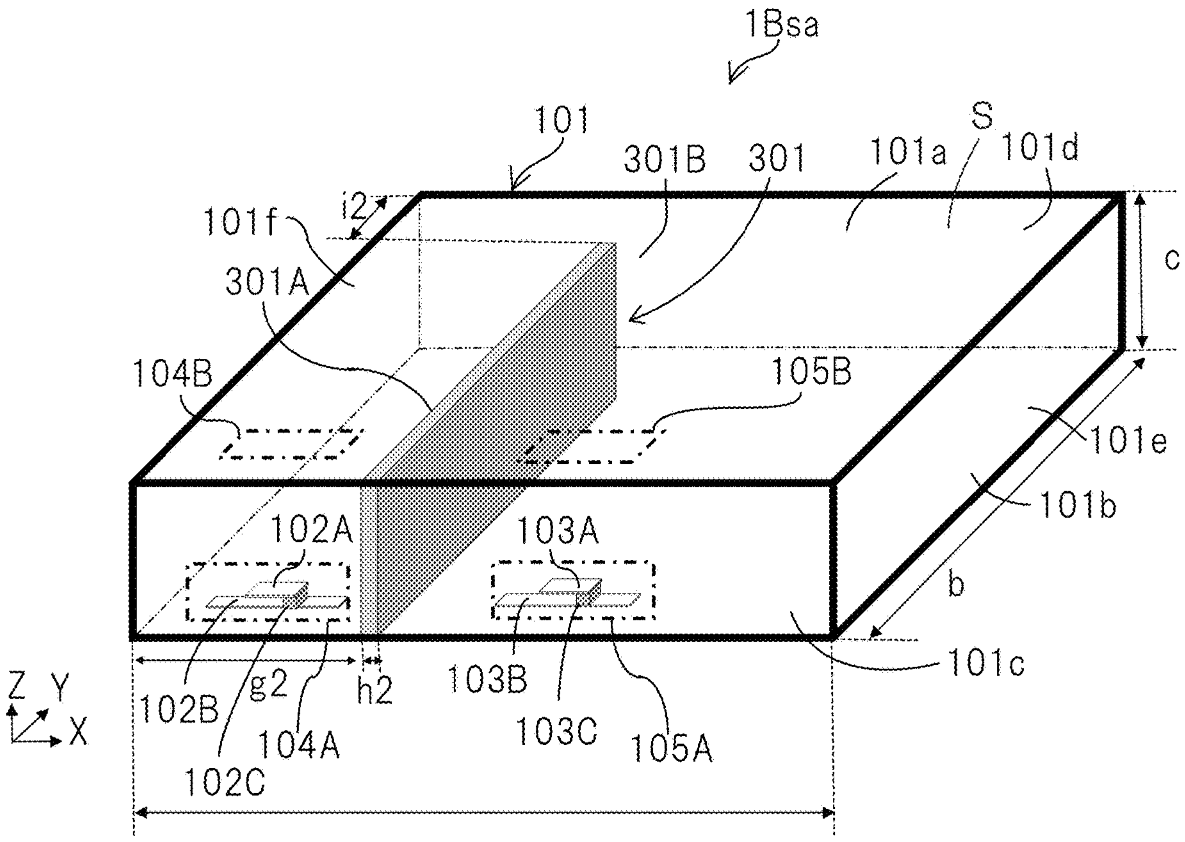
FIG. 13 is a perspective view illustrating a simulation model of the wireless communication apparatus in which a partition plate partitioning a first antenna from a second antenna is disposed.
Figure 14:
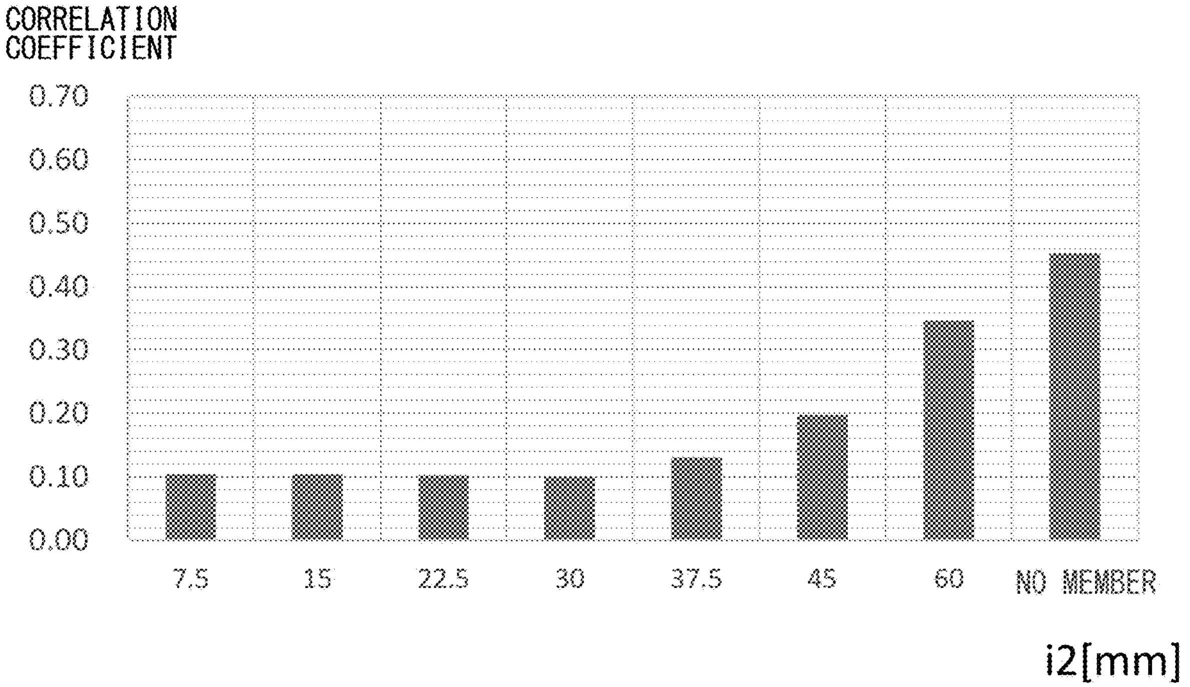
FIG. 14 is a view illustrating a simulation result of a relationship between a width of a passage portion formed by the partition plate and a correlation coefficient of a degree of interference of radio waves.

Simulation of a Case where a Width of a Passage Portion Formed by a Partition Plate is Varied Next, a simulation of a case where a width of the passage portion 301B formed between the partition plate 301A and the rear surface 101*d* of the casing 101 will be described with reference to the drawings. FIG. 13 is a perspective view illustrating a simulation model of the wireless communication apparatus in which a partition plate that partitions a first antenna and a second antenna is arranged. FIG. 14 is a view illustrating a simulation result of a relationship between a width of a passage portion formed by the partition plate and a correlation coefficient of a degree of interference of radio waves.

A wireless communication apparatus 1Bsa illustrated in FIG. 13 is a simulation model constructed by the simulator mentioned above. The wireless communication apparatus 1Bsa is configured similarly as the wireless communication apparatus 1B illustrated in FIG. 12, wherein the passage portion 301B whose distance is the dimension i2 is formed between the partition plate 301A and the rear surface 101*d* of the casing 101. The dimensions of respective portions illustrated in FIG. 13 are the same as the dimensions of respective portions illustrated in FIGS. 3A, 3B, 3C, 5A, and 5B described above (refer to Tables 1 and 2). Further, dimension g2 is set to 131 mm, and dimension h2 is set to 1 mm.

Regarding the wireless communication apparatus 1Bsa of the simulation model configured as above, a simulation is performed of a case where the first antenna 102 and the second antenna 103 output radio waves with a frequency of 2.4 [GHz] simultaneously. The result of numerical values of a correlation coefficient of a case where the dimension i2 of the passage portion 301B is varied from 22.5 [mm] in this simulation is illustrated in FIG. 14. FIG. 14 also illustrates a correlation coefficient of a case where the partition plate 301A is omitted for comparison.

As illustrated in FIG. 14, it can be recognized that the correlation coefficient is reduced if the dimension i2 of the width of the passage portion 301B becomes smaller than ½ the wavelength λ to 60 [mm] and 45 [mm], compared to the case where the partition plate 301A is not provided. Especially, in a case where the dimension i2 becomes 30 [mm] or smaller which is ¼ the wavelength λ or smaller, there is less change of numerical value, such that it may be recognized that the maximum effect was achieved.

Figure 15:
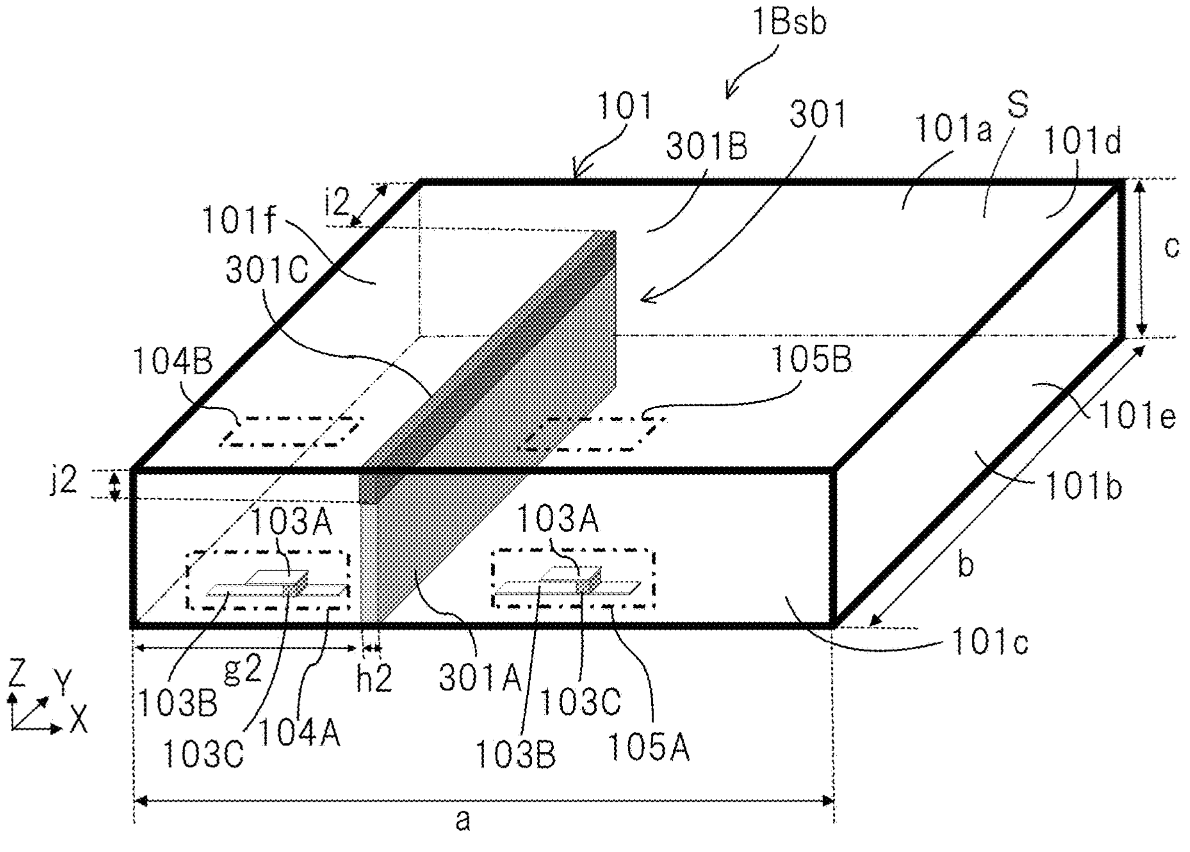
FIG. 15 is a perspective view illustrating a simulation model of the wireless communication apparatus in which a dielectric is disposed between the partition plate and an upper surface of the casing.
Figure 16:
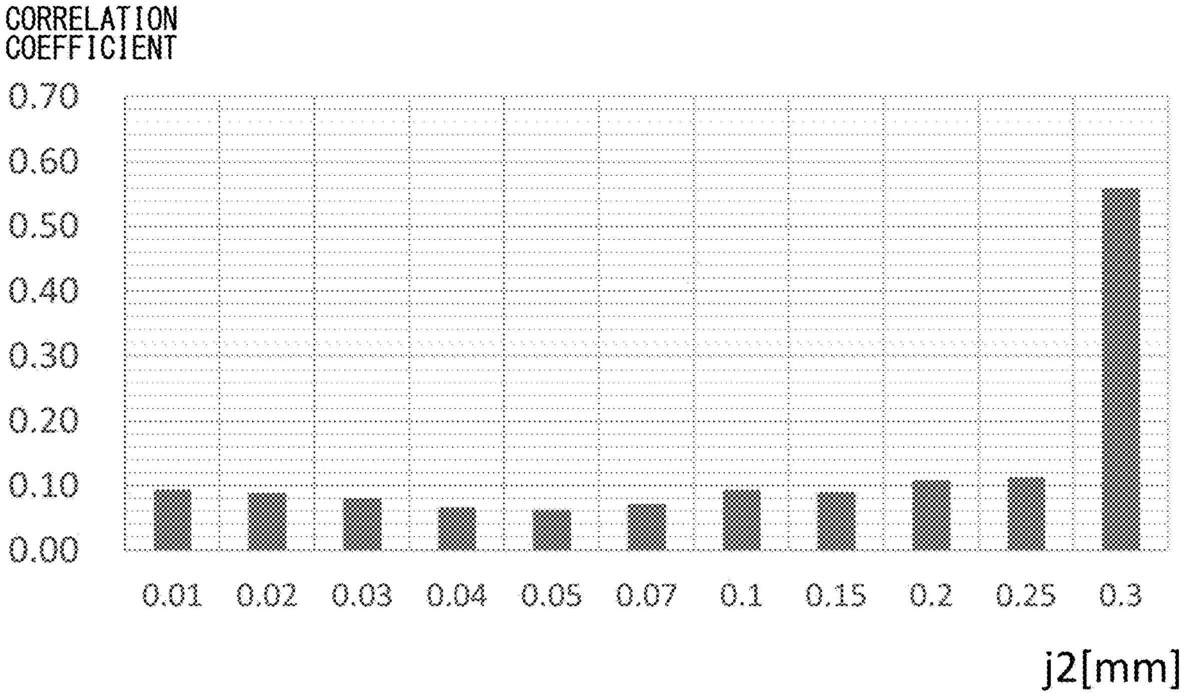
FIG. 16 is a view illustrating a simulation result of a relationship between a height of dielectric and a correlation coefficient of a degree of interference of radio waves.

Simulation of a Case where a Dielectric is Interposed Between the Casing and the Partition Plate Next, a simulation of a case where a the dielectric 301C is interposed between the upper surface 101*a* of the casing 101 and the partition plate 301A will be described with reference to the drawings. FIG. 15 is a perspective view illustrating a simulation model of the wireless communication apparatus in which a dielectric is disposed between the partition plate and an upper surface of the casing. FIG. 16 is a view illustrating a simulation result of a relationship between a height of dielectric and a correlation coefficient of a degree of interference of radio waves.

A wireless communication apparatus 1Bsb illustrated in FIG. 15 has the dielectric 301C disposed between the upper surface 101*a* of the casing 101 and the partition plate 301A.

For example, when assembling the wireless communication apparatus 1Bsb, after assembling the respective components to the interior space S, the upper surface 101*a* is assembled to seal the interior space S and complete the assembling. Therefore, the partition plate 301A and the upper surface 101*a* are not integrally formed. Therefore, the dielectric 301C, such as resin, having a relative dielectric constant of 3.5 or more is interposed between the partition plate 301A and the upper surface 101*a*, and connected electrically with respect to radio waves. That is, depending on the value of dimension j2, capacitive coupling occurs between the upper surface 101*a* of the casing 101 and the end portion on the upper portion of the dielectric 301C in the Z direction, and a configuration is realized where they are not connected electrically with respect to DC, but they are connected electrically with respect to the frequency of wireless communication. Thereby, it becomes possible to prevent externally originated noise having a frequency component other than the frequency of wireless communication from entering the casing. The dielectric 301C should preferably be a material that may be elastically deformed to seal the partition plate 301A and the upper surface 101*a*.

In the wireless communication apparatus 1Bsb of the simulation model configured as above, a simulation is performed of a case where radio waves having a frequency of 2.4 [GHz] are simultaneously output from the first antenna 102 and the second antenna 103. The result of numerical values of correlation coefficient of a case where the dimension j2 of the height of the dielectric 301C is varied according to this simulation is illustrated in FIG. 16. The dimension i2 of the width of the passage portion 301B of the simulation model illustrated in FIGS. 15 and 16 is 22.5 [mm].

As illustrated in FIG. 16, if the dimension j2 of the height of the dielectric 301C becomes 0.25 [mm] or smaller, the casing 101 and the partition plate 301A are electrically connected. Therefore, a correlation coefficient that is substantially equivalent to the case where the dimension i2 of the width of the passage portion 301B as a result of the simulation illustrated in FIG. 14 is 22.5 [mm] is achieved, and it may be recognized that an equivalent effect is achieved.

Figure 17:
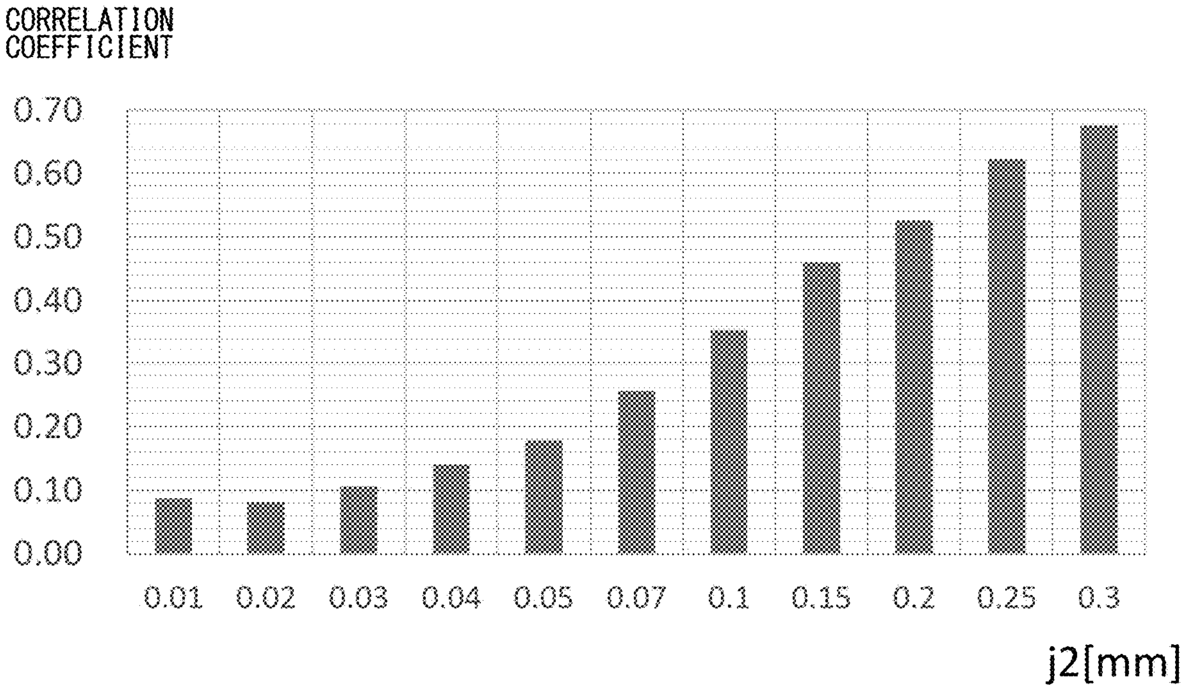
FIG. 17 is a view illustrating a simulation result of a relationship between a height of a gap between the partition plate and an upper surface of the casing and a correlation coefficient of a degree of interference of radio waves.

Simulation of a Case where a Gap is Formed Between the Casing and the Partition Plate Next, a simulation of a case where there is a gap between the upper surface 101*a* of the casing 101 and the partition plate 301A is described with reference to the drawings. FIG. 17 is a view illustrating a simulation result of a relationship between a height of a gap between a partition plate and an upper surface of a casing and a correlation coefficient of a degree of interference of radio waves.

This simulation is performed of a case where the dielectric 301C of the wireless communication apparatus 1Bsb illustrated in FIG. 15 described above is eliminated, and where there is gap between the upper surface 101*a* of the casing 101 and an upper end portion of the dielectric 301C in the Z direction. As mentioned above, since the partition plate 301A and the upper surface 101*a* are not formed integrally, a gap is generated considering component tolerance. Therefore, it is assumed that air is interposed in the gap, such that simulation is performed with the relative dielectric constant of the gap set to 1, and the other conditions set according to the simulation described with reference to FIGS. 15 and 16.

As illustrated in FIG. 17, as the dimension j2 of the height of the gap becomes smaller, the casing 101 and the partition plate 301A are gradually connected electrically. If the dimension j2 is set to 0.03 [mm] or smaller, the casing 101 and the partition plate 301A are electrically connected, and a correlation coefficient is achieved which is approximately equivalent to a case where the dimension i2 of the width of the passage portion 301B is 22.5 [mm] as a result of the simulation illustrated in FIG. 14. Therefore, it is recognized that an equivalent effect is achieved.

Summary of Second Embodiment

As described, the wireless communication apparatus 1B according to the second embodiment has the first antenna 102, the first opening 104A, and the third opening 104B partitioned from the second antenna 103, the second opening 105A, and the fourth opening 105B by the partition plate portion 301. Thereby, even though the apparatus is not equipped with the parasitic antenna element or the metal block as disclosed in WO2010/073429 A1, the radio frequency interference between the first antenna 102 and the second antenna 103 may be reduced. Furthermore, even if all six surfaces of the casing 101 are conductors, the radio frequency interference between the first antenna 102 and the second antenna 103 may be reduced.

Further, the apparatus includes the passage portion 301B, such that the wireless IC 111 of the printed circuit board 110 and the first antenna 102 may be connected by the first cable 108. Further, even if the passage portion 301B is formed on the partition plate portion 301, the radio frequency interference may be reduced if the width of the passage portion 301B is less than ½ the wavelength λ, preferably ¼ or smaller.

OTHER EMBODIMENTS

According to the first and second embodiments described above, a communication according to a MIMO system using the first antenna 102 and the second antenna 103 was described as an example. However, the present technique is not limited thereto, and communication according to a Single Input Multiple Output (SIMO) system or a Multiple Input Single Output (MISO) system may also be performed. In other words, any communication system may be adopted, as long as a plurality of antennas are used for communication.

Further according to the first and second embodiments, the first antenna 102 and the second antenna 103 are monopole antennas. However, the present technique is not limited thereto, and other antennas, such as a dipole antenna, may be used.

Further according to the first and second embodiments, there are two antennas provided, which are the first antenna 102 and the second antenna 103. However, the present technique is not limited to this example, and three or more antennas may be provided. In that case, it is necessary that each of the antennas are partitioned by the partition portion.

Further according to the first and second embodiments, the first antenna 102 and the second antenna 103 are partitioned by a partition portion formed of a conductor, such as the first surrounding portion 106, the second surrounding portion 107, and the partition plate portion 301. If the respective antennas are partitioned as described above, it is necessary to separate the respective antennas and the partition portion by a predetermined distance so as not to allow electrical connection thereof.

Further according to the first embodiment, the first antenna 102 is surrounded by the first surrounding portion 106 and the second antenna 103 is surrounded by the second surrounding portion 107. However, if even only one of the two antennas is surrounded by the surrounding portion, the radio frequency interfaces of both antennas may be reduced, such that it may be possible to dispose only one of the surrounding portions.

Further according to the first and second embodiments, the first antenna 102 and the second antenna 103 are disposed in parallel in the X direction. However, the directions and arrangements of the antennas may be any position and any angle, or posture.

Further according to the first and second embodiments, the widths of the first passage portion 106D, the second passage portion 107D, and the passage portion 301B are set to less than ½ the wavelength λ, preferably ¼ or smaller. That is, the lowest limit of these widths should be set to a width allowing the first cable 108 and the second cable 109 to pass therethrough. However, considering the workability for passing through and installing the first cable 108 and the second cable 109, the widths thereof should preferably be 15 mm or greater. Further, the shapes of the first passage portion 106D, the second passage portion 107D, and the passage portion 301B may be formed as slits. However, any shape may be adopted, as long as the first cable 108 and the second cable 109 may be passed through. In that case, an arbitrary maximum width of the first passage portion 106D, the second passage portion 107D, and the passage portion 301B should be less than ½ the wavelength λ, preferably ¼ or smaller.

Further according to the first and second embodiments, the casing 101 is a hexahedron. However, the present technique is not limited thereto, and the casing may adopt any shape, as long as the casing has at least six surfaces formed of a conductor and the first antenna 102 and the second antenna 103 are surrounded from all directions. Further, even if the corner portions of the casing are not pointed and are rounded, if the casing has six surfaces, it may be considered as a hexahedron.

According to the second embodiment, the dielectric 301C is disposed between the partition plate 301A and the upper surface 101*a*, or a gap is formed therebetween. The dielectric or the gap may similarly be applied between the first surrounding portion 106 or the second surrounding portion 107 and the upper surface 101*a* of the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-011252, filed Jan. 27, 2023 and the benefit of Japanese Patent Application No. 2023-207886, filed Dec. 8, 2023, which are hereby incorporated by reference herein in their entirety.

What is claimed is:

1. A wireless communication apparatus comprising:

a first antenna;

a second antenna;

a control unit configured to output a signal to the first antenna and the second antenna;

a first wiring configured to connect the control unit and the first antenna;

a second wiring configured to connect the control unit and the second antenna;

a casing formed of a conductor, the casing being configured to accommodate the first antenna, the second antenna, the control unit, the first wiring, and the second wiring, the casing extending in a first direction orthogonal to a second direction, and the casing being provided with a first opening disposed in opposition to the first antenna in the second direction and a second opening disposed in opposition to the second antenna in the second direction; and a partition portion formed of a conductor and configured to partition a first space including the first antenna and the first opening from a second space including the second antenna and the second opening, wherein the first antenna is disposed in parallel with the second antenna in the first direction, and wherein the first opening is disposed in parallel with the second opening in the first direction.

2. The wireless communication apparatus according to claim 1, wherein the casing is composed of a hollow thin plate-shaped hexahedron including a pair of first plate-shaped surface and second plate-shaped surface that are disposed in opposition to each other, and a first side surface, a second side surface, a third side surface, and a fourth side surface that are disposed to connect edges of the first plate-shaped surface and the second plate-shaped surface, wherein each of the first plate-shaped surface, the second plate-shaped surface, the first side surface, the second side surface, the third side surface, and the fourth side surface composing the hexahedron is formed of a conductor, and wherein the first opening and the second opening are disposed in parallel with one of surfaces of the hexahedron of the casing.

3. The wireless communication apparatus according to claim 2, wherein the first opening and the second opening are separated by a separation distance of ¼ a wavelength of the signal or greater.

4. The wireless communication apparatus according to claim 2, wherein the partition portion includes a passage portion having a width that is less than ½ a wavelength of the signal and through which the first wiring is passed.

5. The wireless communication apparatus according to claim 4, wherein the partition portion is a first surrounding portion being disposed to surround the first antenna and the first opening in a surface direction of the first plate-shaped surface, wherein the passage portion is a first passage portion, wherein the wireless communication apparatus further comprises a second surrounding portion formed of a conductor, being disposed to surround the second antenna and the second opening in the surface direction of the first plate-shaped surface, and wherein the second surrounding portion includes a second passage portion having a width that is less than ½ the wavelength of the signal and through which the second wiring is passed.

6. The wireless communication apparatus according to claim 5, wherein the first surrounding portion and the second surrounding portion each includes a first plate portion, a second plate portion, and a third plate portion which are erected in a thickness direction orthogonal to the first plate-shaped surface in an interior space of the casing, and by having the first side surface, the first plate portion, the second plate portion, and the third plate portion being disposed in a quadrangular shape when viewed in the thickness direction, the first surrounding portion and the second surrounding portion are configured to surround each of the first antenna and the second antenna in a surface direction of the first plate-shaped surface.

7. The wireless communication apparatus according to claim 6, wherein dimensions of each of the first surrounding portion and the second surrounding portion are set such that, in a hexahedron composed of six surfaces, which are the first plate-shaped surface, the second plate-shaped surface, a first side surface, a first plate portion, a second plate portion, and a third plate portion, when a dimension in an extending direction of the first plate portion having one end connected to the first side surface is denoted by s3, a dimension in an extending direction of the first side surface is denoted by t3, a dimension in the thickness direction is denoted by u3, number of waves are denoted by m, n, and p, a relative dielectric constant of a space within the hexahedron is denoted by εr, a dielectric constant of vacuum is denoted by ε0, and a magnetic permeability of vacuum is denoted by μ0, the dimensions allow a frequency f obtained by Expression (I):

$$f = \frac{\sqrt{\left(\frac{m}{2\times s3}\right)^2 + \left(\frac{n}{2\times t3}\right)^2 + \left(\frac{p}{2\times u3}\right)^2}}{\sqrt{\varepsilon_r \varepsilon_0 \mu_0}}$$

to fall within a frequency band of the signal.

8. The wireless communication apparatus according to claim 7, wherein, in a state where at least one of the m, n, and p is an integer greater than 1, the dimensions s3, t3, and u3 of the hexahedron are set to dimensions that allow the frequency f obtained by the Expression (I) to fall within a frequency band of the signal.

9. The wireless communication apparatus according to claim 6, wherein the first plate portion has one end connected to the first side surface, and is disposed to extend in a direction intersecting the first side surface, wherein the second plate portion has one end connected to the first side surface, and is disposed to extend in the direction intersecting the first side surface and disposed in opposition to the first plate portion, wherein the third plate portion is disposed in opposition to the first side surface and connected to at least one of the first plate portion and the second plate portion, and wherein the first passage portion and the second passage portion are each formed on the third plate portion.

10. The wireless communication apparatus according to claim 6, wherein the first plate portion has one end connected to the first side surface, and is disposed to extend in a direction intersecting the first side surface, wherein the second plate portion has one end connected to the first side surface, and is disposed to extend in a direction intersecting the first side surface and disposed in opposition to the first plate portion, wherein the third plate portion is disposed in opposition to the first side surface and is connected to at least one of the first plate portion and the second plate portion, wherein the second plate portion of the first surrounding portion and the first plate portion of the second surrounding portion are disposed between the first antenna and the second antenna, wherein the first passage portion is formed on the second plate portion of the first surrounding portion, wherein the second passage portion is formed on the first plate portion of the second surrounding portion, and wherein the first passage portion and the second passage portion are disposed in opposition to each other.

11. The wireless communication apparatus according to claim 6, wherein first plate portion has one end connected to the first side surface, and is disposed to extend in a direction intersecting the first side surface, wherein the second plate portion has one end connected to the first side surface, and is disposed to extend in a direction intersecting the first side surface and disposed in opposition to the first plate portion, wherein the third plate portion is disposed in opposition to the first side surface, and connected to at least one of the first plate portion and the second plate portion, wherein the second plate portion of the first surrounding portion and the first plate portion of the second surrounding portion are disposed between the first antenna and the second antenna, wherein the first passage portion is formed on the first plate portion of the first surrounding portion, and wherein the second passage portion is formed on the second plate portion of the second surrounding portion.

12. The wireless communication apparatus according to claim 5, wherein each of the first passage portion and the second passage portion has a width that is ¼ the wavelength of the signal or less.

13. The wireless communication apparatus according to claim 5, further comprising a support member formed of a conductor and configured to support the first antenna, the second antenna, and the control unit, and wherein the first surrounding portion and the second surrounding portion are supported on the support member.

14. The wireless communication apparatus according to claim 5, wherein the first opening and the second opening are formed on the first side surface, and wherein the casing includes a third opening formed at a portion surrounded by the first surrounding portion on the first plate-shaped surface, and a fourth opening formed at a portion surrounded by the second surrounding portion on the first plate-shaped surface.

15. The wireless communication apparatus according to claim 14, wherein the third opening and the fourth opening are separated by a separated distance that is ¼ the wavelength of the signal or more.

16. The wireless communication apparatus according to claim 4, wherein the partition portion is a partition plate that is erected within an interior space of the casing in a thickness direction orthogonal to the first plate-shaped surface so as to partition the first antenna and the first opening from the second antenna, the second opening, and the control unit.

17. The wireless communication apparatus according to claim 16, wherein the partition plate is connected to the first side surface in a surface direction of the first plate-shaped surface, and forms the passage portion therebetween with the second side surface disposed in opposition to the first side surface.

18. The wireless communication apparatus according to claim 17, wherein the passage portion has a width that is ¼ the wavelength of the signal or less.

19. The wireless communication apparatus according to claim 2, further comprising a dielectric, wherein the partition portion has one end connected to the second plate-shaped surface in a thickness direction orthogonal to the first plate-shaped surface, and wherein the dielectric is disposed between the other end of the partition portion and the first plate-shaped surface.

20. The wireless communication apparatus according to claim 19, wherein the dielectric has a relative dielectric constant of 3.5 or more, and is formed to be 0.25 [mm] or smaller in the thickness direction.

21. The wireless communication apparatus according to claim 2, wherein the partition portion has one end connected to the second plate-shaped surface in a thickness direction orthogonal to the first plate-shaped surface, and wherein a gap is provided between the other end of the partition portion and the first plate-shaped surface.

22. The wireless communication apparatus according to claim 21, wherein the gap is formed to be 0.03 [mm] or smaller in the thickness direction.

23. An electronic equipment comprising:

the wireless communication apparatus according to claim 1, and an electrooptical device disposed within the casing.

24. A radiographing system comprising:

the wireless communication apparatus according to claim 1; and a control unit, wherein the wireless communication apparatus is a radiographing apparatus that includes a radiation detecting panel, and that is configured to transmit a radiation image data acquired from a radiation detecting panel through wireless communication, and wherein the control unit is configured to control the radiographing apparatus.

* * * * *